United States Patent
Tadokoro et al.

[11] Patent Number: 5,888,916
[45] Date of Patent: Mar. 30, 1999

[54] WET-LAID NONWOVEN FABRIC FOR BATTERY SEPARATOR, ITS PRODUCTION METHOD AND SEALED TYPE SECONDARY BATTERY

[75] Inventors: Yoshiyuki Tadokoro; Masaru Uesaka; Yoshinori Takata; Fumigo Goto, all of Nobeoka, Japan

[73] Assignee: Asahi Kasei Kogyo Kabushiki Kaisha, Osaka, Japan

[21] Appl. No.: 860,492
[22] PCT Filed: Dec. 27, 1995
[86] PCT No.: PCT/JP95/02737
  § 371 Date: Jun. 27, 1997
  § 102(e) Date: Jun. 27, 1997
[87] PCT Pub. No.: WO96/20505
  PCT Pub. Date: Jul. 4, 1996

[30] Foreign Application Priority Data

Dec. 28, 1994 [JP] Japan .................................. 6-337690
Dec. 28, 1994 [JP] Japan .................................. 6-337691

[51] Int. Cl.⁶ .................................................. D04H 1/00
[52] U.S. Cl. ........................ 442/334; 28/104; 156/62.6; 156/308.2; 442/361; 442/364; 442/408; 442/409
[58] Field of Search ..................... 442/361, 364, 442/408, 409, 334; 156/62.6, 308.2; 28/104

[56] References Cited

FOREIGN PATENT DOCUMENTS

| | | |
|---|---|---|
| 56-138863 | 10/1981 | Japan . |
| 61-281454 | 12/1986 | Japan . |
| 1-157055 | 6/1989 | Japan . |
| 2-6651 | 1/1990 | Japan . |
| 2-259189 | 10/1990 | Japan . |
| 3-14694 | 1/1991 | Japan . |
| 5-74440 | 3/1993 | Japan . |
| 5-89867 | 4/1993 | Japan . |
| 5-94813 | 4/1993 | Japan . |
| 6-295715 | 10/1994 | Japan . |
| 7-272709 | 10/1995 | Japan . |

*Primary Examiner*—James J. Bell
*Attorney, Agent, or Firm*—Finnegan, Henderson, Farabow, Garrett & Dunner, L.L.P.

[57] ABSTRACT

An improved wet-laid nonwoven fabric for a battery separator wherein 20 to 95% by weight of thermoplastic staple fibers having a single fiber diameter of 20 μm, or less are three-dimensionally entangled with hot-melt fibers having a melting point lower by 20° C. than that of the thermoplastic staple fibers so that a mean fiber entangling point interval is 300 μm or less, wherein at least part of the hot-melt fibers are fused to bond the fibers with each other to fix the nonwoven structure. The nonwoven fabric has a basis weight in a range from 10 to 350 g/m², a thickness in a range from 30 to 1000 μm and an apparent density in a range from 0.26 to 0.7 g/cm³, and is excellent in uniformity and mechanical strength. The wet-laid nonwoven fabric is particularly excellent in air permeability, liquid holding capability, liquid retention capability and liquid absorption rate and satisfies the requirement for a battery separator. Therefore, it is useful for the production of a high performance secondary battery having favorable overcharging characteristics and cycle characteristics. The wet-laid nonwoven fabric according to the present invention is prepared by subjecting a wet-laid web of staple fibers having a ratio L/D of a fiber length L to a single diameter D in a range from $0.5 \times 10^3$ to $2.0 \times 10^3$ to a hydroentangling treatment while taking care not to leave a mark from a water jet on the web.

10 Claims, 4 Drawing Sheets

WET-LAID NONWOVEN FABRIC FOR BATTERY SEPARATOR, ITS PRODUCTION METHOD AND SEALED TYPE SECONDARY BATTERY

TECHNICAL FIELD

The present invention relates to an improved wet-laid nonwoven fabric for a battery separator, a method for manufacturing the same, and a sealed type secondary battery using the same.

BACKGROUND ART

A nonwoven fabric for a battery separator has a function for separating an anode from a cathode, preventing electrode active material or electrode debris from migrating from one electrode to another to cause a short-circuit and for retaining an electrolyte therein. Also it must have a low internal resistance and/or a favorable chemical stability and durability against the electrolyte. Particularly, in a secondary battery such as a Ni-Cd storage battery, it is necessary that an oxygen gas generated upon overcharge due to a cathode reaction is smoothly consumed in an anode, and the electrolyte is prevented from being released from the separator due to the change in electrode thickness upon charging/discharging. A high gas-permeability and a high electrolyte holding capability are also required as a separator even after the compression is repeated. Also, a mechanical strength durable against a tension applied to the separator when the same is incorporated in a battery is one of the important requisites.

However, battery separators made of a conventional nonwoven fabric, such as a melt-blown type, a flash-spun type, a dry-laid type or a wet-laid type, have been unsatisfactory in the above requirement.

For example, Japanese Unexamined Patent Publication (Kokai) No. 1-157055 proposes the improvement in mechanical strength, electrolyte retention capability and short-circuit preventing ability, by heating a melt-blown type nonwoven fabric under a predetermined condition to form a compact structure on the surface thereof. However, the mechanical strength of the nonwoven fabric could not be improved by merely hot-pressing the same, but higher temperature and pressure are necessary for obtaining a desired mechanical strength, which results in a problem in that the electrolyte holding capability and gas-permeability deteriorate thereby. Japanese Unexamined Patent Publication (Kokai) No. 2-259189 discloses the improvement in mechanical strength and electrolyte retention capability of a nonwoven fabric by thermally bonding alkali-resistant fibers with hot-melt fibers in a wet-laid mixture fiber sheet. However, it is necessary to increase an amount of hot-melt fibers and increase the bonding temperature to obtain a higher mechanical strength, which results in a reduction in the number of voids in a fiber surface and a sheet to cause the deterioration of electrolyte retention capability. On the contrary, if a lower thermal bonding temperature is used, the mechanical strength becomes unsatisfactory for a battery separator and causes a problem in that the nonwoven fabric structure is liable to collapse upon compression, due to a poor interfiber entanglement, which results in the exhaustion of electrolyte in the separator; a so-called "dry-out"; and increases the electric resistance of the battery.

Japanese Unexamined Patent Publication (Kokai) No. 61-281454 discloses that a melt-blown type nonwoven fabric comprising fibers having a single fiber diameter in a range from 0.1 to 2 $\mu$m is bonded with a sheet comprising fibers having a single fiber diameter of 5 $\mu$m or more by highly pressurized water jets to result in a product suitably used for a battery separator, improved in air permeability and cathode/anode separation ability and capable of preventing short-circuit from occurring due to the migration of active material or debris from electrodes. However, the resultant nonwoven product has a plurality of through-holes on the surface thereof due to the highly pressurized water jets, which deteriorates the ability for preventing the active material from migrating. In Japanese Unexamined Patent Publication (Kokai) No. 5-89867, a method is disclosed wherein a nonwoven fabric is compressed with rolls having different peripheral speeds to contract the through-holes, but the through-holes, once formed on the surface of the nonwoven fabric, are difficult to eliminate.

Since the nonwoven fabric disclosed in the above-mentioned Japanese Kokai No. 61-281454 is a sheet of a double-layer structure comprised of a melt-blown type nonwoven fabric of ultra-fine fibers and a dry-laid web, surface areas and densities of fibers composing the layers are different between the respective layers in the cross-sectional direction and thus the electrolyte held therein becomes uneven to increase the internal battery resistance. Also, since the nonwoven fabric layer of melt-blown fibers lacks the uniformity in basis weight due to the spinning method itself, it is impossible to inhibit the migration of active material through a portion having a lower basis weight, whereby the short-circuit preventing ability becomes inferior. In addition, since the nonwoven fabric is liable to wear due to the compression thereof by the repetition of volumetric change caused by the charging/discharging of the secondary battery, the electrolyte may be released therefrom to deteriorate the durability of the secondary battery against the repetition of charging/discharging cycles.

In Japanese Unexamined Patent Publication (Kokai) No. 5-74440, there is a disclosure that, after a wet-laid mixture sheet of staple fibers, hot-melt fibers and a synthetic pulp is subjected to a fluid treatment, the hot-melt fibers and the synthetic pulp fibers are heat-bonded to each other to obtain a nonwoven fabric improved in short-circuit preventing ability, electrolyte retention capability and mechanical strength. This proposal, however, has a drawback in that the synthetic pulp fiber is not capable of maintaining its fibrous shape during the heat treatment for bonding the hot-melt fibers to reduce the surface area of the fibers in the nonwoven fabric structure and increase the interfiber distance, whereby the electrolyte in the separator easily migrates to electrodes to result in a rise in electrical resistance.

Japanese Unexamined Patent Publication (Kokai) No. 7-272709 discloses a battery separator having an improved short-circuit preventing ability by bonding fibrous material having a fibril-like bifurcate structure, such as synthetic pulp fibers, to a permeable interstitial structure of an entangled fibrous web obtained by subjecting a wet-laid web of splittable fibers to a hydroentangling treatment. However, since this separator is of a double-layered structure consisting of a surface layer of the entangled fiber web and a fibrous body having a fiber composition and structure different from the former, which is overlaid thereon in an irregular manner in accordance with the density variance of the entangled fiber web, the electrolyte is liable to be irregularly contained therein to increase the electric resistance or increase the variance of air permeability and electrolyte retention capability.

In addition, since the fibrous structure of this separator has a lower entangling density in its own structure as well as between the same and the entangled fiber web, the fibers in the fibrous body are easily released. Also, if the fibrous body is bonded to the entangled fiber web by the heat treatment, the fibrous shape disappears and, in an extreme case, the web becomes film-like, resulting in a problem in that the electrolyte retention capability deteriorates and the electrolyte is unevenly held in the surface layer.

In Japanese Unexamined Patent Publication (Kokai) No. 6-295715, there is a description in that a wet-laid sheet of acrylic staple fibers with added metallic ions, having a single fiber diameter in a range from 3 to 10 μm and a ratio of fiber length L to fiber diameter D (L/D) in a range from 1000 to 2000 is hot-pressed, after being subjected to a water jet interlacing treatment, to result in a battery separator excellent in resistance to acids. However, this wet-laid nonwoven material is unstable because the three-dimensionally entangled structure is not fixed by fibers such as hot-melt fibers, whereby there may be a problem in that a widthwise contraction occurs due to a tension during the assembly of the battery, and exhaustion of electrolyte is generated due to the compression of separator upon the swelling of the electrode plate. Also, since the hydroentangling treatment is carried out without a rocking motion of a nozzle header, many continuous stripe marks in a warp direction appear on the surface of the nonwoven material, and this deteriorates the uniformity of formation thereof. Thus the short-circuit preventing ability in the irregular mark portion becomes worse when the sheet is used as a battery separator because the electrode active materials or others migrate therethrough.

DISCLOSURE OF THE INVENTION

An object of the present invention is to solve the above-mentioned various problems in the prior art nonwoven material and provide a high performance wet-laid nonwoven fabric suitable for use as a battery separator.

Another object of the present invention is to provide a wet-laid nonwoven fabric improved in properties such as gas permeability, electrolyte retention capability and liquid absorption rate to be suitable as a battery separator and having a high tensile strength and a high uniformity of a basis weight.

A further object of the present invention is to provide a sealed type secondary battery capable of significantly minimizing the occurrence of short-circuit accidents caused by the migration of active material and preventing the generation of dry-out of electrolyte, having a long life span against the repetition of charging/discharging cycles.

The above objects of the present invention are achievable by a wet-laid nonwoven fabric for a battery separator characterized in that the wet-laid nonwoven fabric comprises a single nonwoven structure layer having a mean fiber entangling point interval of 300 μm or less in which at least one kind of thermoplastic fiber staple fibers in a range from 20 to 95% by weight and hot-melt staple fibers, each staple fibers having a single fiber diameter of 20 μm or less, wherein the fiber are three dimensionally entangled with each other, and at least part of the hot-melt fibers adhere and bond to the thermoplastic staple fiber by fusing to fix the single nonwoven structure layer.

The staple fibers used for the present invention are selected from fibrous materials having a fiber length capable of being treated by a wet-laying process. A ratio (L/D) of the fiber length (L mm) to a circular cross-sectional fiber diameter (D) calculated by the following equation (I) based on a fiber thickness represented by denier is preferably in a range from $0.5 \times 10^3$ to $2.0 \times 10^3$.

$$D = \sqrt{[4d/(\pi \times 9 \times 10^5 \times \rho)]} \times 10 \quad \text{(I)}$$

wherein D is a single fiber diameter represented by μm; ρ is a density of a polymer forming the fiber represented by $g/cm^2$; d is a fiber thickness represented by denier; and π is the circular constant (the number π).

The thermoplastic staple fiber is selected from synthetic thermoplastic polymer fibers, while the hot-melt fiber is selected from thermoplastic polymer fibers having a melting point lower by about 20° C. than that of the former synthetic thermoplastic polymer fibers.

The nonwoven fabric for a battery separator according to the present invention is basically comprised of a mixture of the thermoplastic staple fibers in a range from 20 to 95% by weight and the hot-melt staple fibers of the remaining part.

In the wet-laid nonwoven fabric according to the present invention, the above-mentioned fibers are three-dimensionally and randomly entangled with each other in a cross-section of a nonwoven structure, and at least part of the hot-melt fibers forming the interlaced structure are adhered to the thermoplastic staple fibers to fix the nonwoven structure.

The mean fiber entangling point interval referred to in the present invention is a measure for an entangling density between fibers in a nonwoven structure measured in accordance with a method disclosed in Japanese Unexamined Patent Publication (Kokai) No. 58-191280, from page 443, lower right column, line 8 to page 444, upper left column, line 2. That is, while a surface of a nonwoven sheet is observed by a scanning type electron microscope, an optional pair of fibers ($f_1$) and ($f_2$) interlaced with each other at a point ($a_1$) are selected from a group of fibers ($f_1$), ($f_2$), ($f_3$) . . . ($f_n$) as shown in FIG. 1 described later. The upper fiber ($f_2$) is traced until reaching a point ($a_2$) where it runs beneath a third fiber. A linear distance between the two interlaced points ($a_1$) and ($a_2$) is measured as a fiber entangling point interval. The same procedure is repeated 50 times for other optional pairs of fibers to obtain 50 interlaced point distances, which are simply averaged to result in the mean fiber entangling point interval. The smaller this value, the higher the entangling density.

Since the wet-laid nonwoven fabric for a battery separator according to the present invention has a compact, three-dimensionally entangled structure of which the mean fiber entangling point interval is 300 μm or less, comprised of staple fibers having a single fiber diameter of 20 μm or less, it has an excellent uniformity inherent to a wet-laid nonwoven fabric comprised of staple fibers while solving the problem of insufficient strength inherent to the wet-laid nonwoven fabric. Since this nonwoven fabric is excellent in formation, a separator capable of inhibiting the migration of electrode active material (i.e., passing of active material through fiber interstice) is obtainable therefrom, even though a basis weight is smaller, and thus it is possible to significantly improve a life span and a resistance to short-circuits of a secondary battery wherein a charging/discharging cycle is repeated. Also, since the mechanical strength is high, it is possible to reduce a basis weight of the battery separator, and thus to incorporate more active material for electrode into the battery, resulting in an increase in the capacity of the battery.

Also, since an internal resistance of the battery separator according to the present invention is low, because of a compact interlaced structure having the mean fiber entangling point interval of 300 μm or less, this separator exhibits an excellent performance in that the charging voltage of the secondary battery is low and the discharging voltage is high. In addition, since the nonwoven fabric according to the present invention has a high resistance to compression, a change in thickness of the electrode when the charging/discharging is repeated is minimized, whereby it is possible to suppress the increase in internal resistance and/or the drying-out of electrolyte within the separator due to the compression thereof. These properties are further enhanced if the mean fiber entangling point interval is 250 µm or less and, preferably 200 µm or less. In other words, if the mean fiber entangling point interval is more than 300 µm, that is, when the entangling density of fibers is lower, the above-mentioned properties or effects would not be achievable in the separator.

Although the wet-laid nonwoven fabric for a battery separator according to the present invention is treated during the production thereof with a highly pressurized columnar water jet to have a three-dimensional entangled structure of staple fibers, there is substantially no stripe marks thereon due to such a highly pressurized columnar water jet. In the prior art, when a fibrous sheet is subjected to a highly pressurized columnar water jet treatment, continuous stripes caused by the water jets ejected from nozzles moving relative to the fibrous sheet appear on the surface of the resultant nonwoven fabric. It was found through a microscopic observation that this continuous stripe mark is concave, and accompanied with a convex zone of unevenly distributed fibers in the vicinity thereof. If such a wet-laid nonwoven fabric having continuous microscopic marks on the surface thereof is used as a separator, the migration of active material occurs in the concave zone of continuous mark having a smaller basis weight, resulting in the deterioration of resistance to short-circuit. Since the wet-laid nonwoven fabric according to the present invention is extremely uniform and there is no substantial continuous mark described above on the surface thereof, it exhibits an excellent resistance to short-circuit and a long life span against the repetition of charging/discharging cycle when used as a battery separator even if it has a smaller basis weight and is applied to a high capacity secondary battery.

The wet-laid nonwoven fabric for a battery separator is characterized by a uniform basis weight. A sheet formation thereof is preferably 100 or less and, more preferably 80 or less.

The sheet formation referred to in the present invention is a measure for representing a uniformity of fiber dispersion or fiber distribution in the wet-laid nonwoven structure, which is an overall index for estimating the irregularity of the nonwoven fabric, including basis weight, thickness, density or others. While various methods have been known for measuring the sheet formation, the present invention adopts "sheet formation" measured by a marketed formation tester (FMT-1000A available from Nomura Shoji K.K.) described later based on a principle of "image analysis type formation (C)" disclosed in "Estimation of Watermark Formation (1)—Estimation by Marketed Formation Tester—" by Junji OSAWA; Journal of Paper & Pulp Technology Association, Vol. 46, No. 7, pages 78 to 93. This sheet formation properly represents the variance of basis weights in micro areas of the nonwoven fabric, and is usable in place of uniformity. The smaller the value, the more the uniformity relied upon the fiber distribution.

If the sheet formation exceeds 100, the variance of basis weights in micro areas becomes too large to suppress the migration of electrode active material through a portion having a small basis weight, resulting in a risk of short-circuit and/or the deterioration of cycle performance of the secondary battery.

An electric resistance of the wet-laid nonwoven fabric is preferably 1.0 Ω or less and, preferably 0.8 Ω or less. If the electric resistance is higher than 1.0 Ω, there may be a problem in that a charging voltage of the secondary battery becomes higher or a predetermined discharging voltage is not obtainable.

A compression stress of the wet-laid nonwoven fabric according to the present invention is preferably 3.0 kg/cm$^2$ or more, because in such a case, a resistance to swelling of electrode upon discharging becomes large to prevent the collapse of the battery separator. More preferably the compression stress is 3.5 kg/cm$^2$ or more. If the compression stress is lower than 3.0 kg/cm$^2$, the separator may collapse due to the compressive force from the electrodes in the battery when the charging/discharging cycle is repeated, resulting in wear of the separator to cause the drying-out of electrolyte which in turn increases the internal resistance.

A basis weight of the wet-laid nonwoven fabric according to the present invention for a battery separator is in a range from 10 to 350 g/m$^2$ and, preferably from 25 to 150 g/m$^2$, more preferably from 35 to 100 g/m$^2$.

A thickness thereof is in a range from 30 to 1000 µm, preferably from 70 to 400 µm and, more preferably from 90 to 250 µm.

If the basis weight is less than 10 g/m$^2$ and the thickness is less than 30 µm, a strength of the separator becomes too small to completely prevent the active material from migrating therethrough, and an amount of electrolyte retained therein is excessively small to deteriorate the performance of the battery separator. Contrarily, if the basis weight exceeds 350 g/m$^2$ and the thickness exceeds 1000 µm, the entangling density becomes lower to increase the electric resistance and reduce a space for retaining electrode active material, resulting in a problem in that a battery having a sufficient capacity is not obtainable.

The wet-laid nonwoven fabric for a battery separator according to the present invention may be produced by preparing a mixture fiber sheet from a slurry containing at least one kind of thermoplastic staple fibers in a range from 20 to 95% by weight and hot-melt fibers having a melting point lower by 20° C. than that of the former thermoplastic staple fibers through a wet-laying process, applying fluid jets onto the mixture fiber sheet to three-dimensionally entangle the fibers composing the same with each other, and fusing part or all of the hot-melt fibers by a heat treatment.

The wet-laid nonwoven fabric of a uniform structure having the above-mentioned sheet formation of 100 or less is preferably produced by suitably controlling the process conditions of the wet-laying method and the entangling treatment with columnar fluid jets in accordance with the following principle:

To obtain a mixture fiber sheet having a favorable formation through a wet-laying process, it is necessary to form a sheet from a uniform slurry in which staple fibers having L/D in the predetermined range defined by the present invention are individually dispersed. Actually, the longer the fiber length, the lower the fiber-dispersibility to worsen the uniformity of formation. A critical fiber concentration at which fibers are individually dispersed without forming a block (fiber lump) is in proportion to the fiber thickness and is in inverse proportion to a square of the fiber length. Accordingly, it is difficult to obtain a mixture fiber sheet having a sheet formation of 100 or less through a wet-laying process from a slurry of long fibers having L/D exceeding 1500.

To obtain a uniformly entangled sheet having a sheet formation of 100 or less while preventing fibers from being unevenly distributed due to the migration of fibers during the entangling treatment of staple fibers with columnar water jets, the following is important. Since short fibers having L/D of less than 500 are very mobile, it is difficult to prevent the fibers from migrating in the columnar water jet treatment. To prevent the fibers from migrating to leave continuous stripe marks due to the columnar water jets, a metallic net in a range from 10 to 60 mesh is located between a nozzle for ejecting a columnar water jet arranged on a rockable header and a conveyor net, so that the columnar water jets becomes intermittent to three-dimensionally entangle fibers without leaving the continuous stripe marks on the mixture fiber sheet. To quickly remove the treatment water, it is necessary to apply sufficient suction to the lower side of the conveyor net. This entangling treatment with the intermittent columnar water jets does not leave the continuous stripe marks but leaves dotted line-like marks on the mixture fiber sheet to result in a uniform nonwoven structure. A static pressure used for this suction-dehydration is −30 mmHg or more, preferably −50 mmHg or more and, more preferably −80 mmHg or more to achieve the uniform fiber entanglement while preventing the fiber migration.

The heat treatment is carried out for the purpose of fixing the three-dimensional entangled structure so that part of the hot-melt fibers is fused at an entangled point between the thermoplastic staple fiber and the hot-melt fiber to bond both the fibers together, while maintaining the three-dimensionally entangled state. If the heat treatment is carried out on a nonwoven fabric wherein the three-dimensional entanglement is none at all or insufficient such that the mean fiber entangling point interval exceeds 300 μm, there are less entangled points between the thermoplastic staple fibers and the hot-melt fibers and the fibers are bonded together in parallel to each other while forming a fused film therebetween, which state is apparently distinguished from the present invention. According to the present invention, a three-dimensionally entangled structure of a wet-laid nonwoven fabric wherein the mean fiber entangling point interval is 300 μm or less is fixed as it is at a number of entangled points between fibers by the fused hot-melt fibers, whereby a nonwoven structure suitable for a battery separator is obtainable, having a high resistance to electrode compression, a high electrolyte holding capability and a small electric resistance.

BEST MODE FOR CARRYING OUT THE INVENTION

Figure 1:
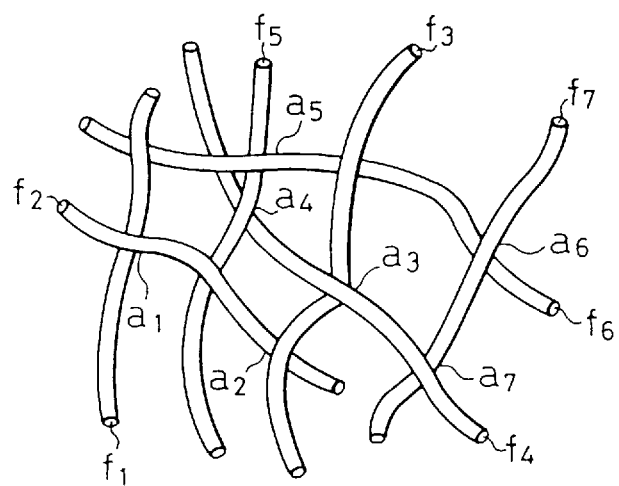
FIG. 1 is a schematic enlarged view of an interlaced state of fibers on a surface of a nonwoven fabric, wherein $(f_1)$, $(f_2)$, $(f_3)$ ... $(f_r)$ denote individual fibers, respectively, and $(a_1)$, $(a_2)$, $(a_3)$ ... $(a_r)$ denote interlaced points, respectively.

The thermoplastic staple fibers and the hot-melt staple fibers suitable for the present invention are preferably those having durability against an alkali or an acid such as an electrolyte.

Examples of alkaline storage batteries include nickel-cadmium types, nickel-hydrogen types, nickel-iron types and silver oxide-zinc types of a button shape or a cylindrical shape. For such batteries using an alkaline electrolyte, the following is preferably used but not limited thereto; alkali-resistant polyolefins such as polyethylene or polypropylene; polyolefins having hydrophilic groups such as COOH, $SO_3H$, OH, COOM, $SO_3M$ or OM (M denotes a light or heavy metal); polyamides such as nylon 6, nylon 66, nylon 610, nylon 612, nylon 10 or nylon 12; aramids such as polyparapheneyleneterephthalamide; which may be used alone or in combination with others.

A lead storage battery is a typical one using an acidic electrolyte. For such batteries, the following is preferably used; acid-resistant polyesters such as polyethyleneterephthalate or polybutyleneterephthalate; polyolefins such as polyethylene or polypropylene; polyolefins having hydrophilic groups such as COOH, $SO_3H$, OH, COOM, $SO_3M$ or OM (M denotes a light or heavy metal); acrylics; aramids such as polyparapheneyleneterephthalamide; which may be used alone or in combination with others.

The hot-melt fibers composing the nonwoven fabric of the present invention are those having a melting point lower by 20° C. or more than that of the thermoplastic staple fibers. If there are two kinds or more of the thermoplastic staple fibers, the melting point of the hot-melt fiber is preferably lower by 20° C. or more than that of the thermoplastic staple fiber having the lowest melting point. If the difference between the melting points is less than 20° C., part of the thermoplastic staple fibers may be fused when the hot-melt fibers are fused, to cause a problem in that a sufficient strength is not obtainable in the resultant nonwoven structure and an electrolyte holding capability becomes poor.

The hot-melt fibers used in the present invention may be conventional ones usually used for a thermally bonded dry-laid nonwoven fabric or a thermally bonded wet-laid nonwoven fabric, including composite fibers such as a sheath-core type or a side-by-side type and mono-component fibers. Of them, in view of a favorable liquid-holding capability, a high tensile strength and a good dimensional stability, the sheath-core type is most preferable as a hot-melt fiber.

For example, the sheath-core type hot-melt fiber of alkali-resistant type includes, for example, one having a nylon 66 core component and a nylon 6 sheath component; one having a nylon 6 or nylon 66 core component and a nylon copolymer sheath component such as nylon 612 or nylon 610, or a polyolefin sheath component such as polyethylene or polypropylene; and one having a polypropylene core component and a polyethylene sheath component.

On the other hand, as the sheath-core type heat fusible fiber of acid-resistant type, a combination of a polyester core component such as polyethyleneterephthalate or polybutyleneterephthalate and a polyester copolymer sheath component or polyolefin sheath component such as polyethylene or polypropylene is preferably used for the present invention.

In the nonwoven fabric according to the present invention, a mixture ratio of the hot-melt fibers to the nonwoven fabric is in a range from 5 to 80% by weight, preferably from 10 to 70% by weight and, more preferably from 10 to 40% by weight.

If the mixture ratio exceeds 80% by weight, bonded portions between fibers excessively increase to lower the liquid retention ratio. Contrarily, if the mixture ratio is less than 5%, the tensile strength and the dimensional stability become poor. In the latter case, even though the nonwoven fabric wherein the staple fibers are three-dimensionally and compactly entangled with each other is used as a battery separator, it may shrink in the widthwise direction under tension, to result in a problem of electrode short-circuit when the battery is assembled, or it may be liable to collapse to cause drying-out of electrolyte.

It is necessary that a single fiber diameter of the thermoplastic staple fiber and the hot-melt fiber is 20 μm or less in view of the gas permeability, short circuit preventing ability and electrolyte holding capability, preferably in a range from 1 to 20 μm and; more preferably from 2 to 20 μm. If the single fiber diameter is excessively small, the gas-permeability becomes poor, while if exceeding 20 μm, an interfiber distance becomes too large to result in a favorable short-circuit preventing ability.

If a thermoplastic staple fiber having a single fiber diameter in a range from 1 to 8 μm is used as a wet-laid nonwoven fabric for a high performance battery separator, a compact and uniform separator is obtainable, excellent in short-circuit preventing ability and electrolyte holding capability. While, when a separator is used for a sealed type secondary battery, an ability for permeating gas generated by the electrode reaction and a resistance to compressive force due to the swelling of electrode must be further enhanced. To satisfy such requirements, the above-mentioned thermoplastic staple fibers having a single fiber diameter in a range from 1 to 8 μm are mixed with other thermoplastic staple fibers having a single fiber diameter larger than that of the former and compactly and three-dimensionally entangled with each other, whereby the gas permeability and resistance to compressive force are improved together with the above-mentioned short-circuit preventing ability and electrolyte holding capability. In such a case, a difference in the single fiber diameter between thicker and thinner groups of the thermoplastic staple fibers is 50% or more and, preferably 100% or more relative to a single fiber diameter of the thinner group represented by denier. For example, there may be pairs of 0.5 denier and 0.8 denier; 0.05 denier and 0.08 denier; and 0.5 denier and 1.0 denier. A mixture ratio of the thermoplastic staple fibers having a single fiber diameter in a range from 1 to 8 μm to the nonwoven fabric is preferably in a range from 5 to 95% by weight, more preferably from 10 to 90% by weight and, most preferably from 20 to 80% by weight. If the ratio exceeds 95% by weight, a mixture ratio of the thicker thermoplastic staple fibers and the hot-melt fibers becomes smaller to deteriorate the mechanical strength, dimensional stability and air permeability. Contrarily, if the ratio of the thicker group fibers is less than 5% by weight, the short-circuit preventing ability, electrolyte retention capability and electrolyte holding capability become poor, and a separator obtained from such a nonwoven fabric is unsuitable as a high performance battery separator although it is usable for a general purpose battery.

The thermoplastic staple fibers having a single fiber diameter in a range from 1 to 8 μm may be obtained directly by spinning or via composite fibers such as a splittable type or an island-in-sea type. When the composite fibers are used, they may be subjected to a water jet, mechanical or chemical treatment to be of an individual micro-fiber diameter in a range from 1 to 8 μm prior to or after the preparation of a wet-laid nonwoven fabric. To obtain a uniform wet-laid nonwoven fabric having a favorable sheet formation, the ultrafine fibers having a single fiber diameter in the above range are favorably prepared prior to the preparation of the nonwoven fabric.

A cross-section of the individual fiber may be either circular or non-circular. The single fiber diameter is determined by the direct measurement of a diameter if the cross-section of the single fiber is circular. While, if it is non-circular, a thickness of the single fiber represented by denier is first determined in accordance with a weight method, then the denier value is converted to a mean fiber diameter D by the following equation, which corresponds to a diameter if the fiber is assumed to have a circular cross-section.

$$D = \sqrt{[4d/(\pi \times 9 \times 10^5 \times \rho)]} \times 10^4$$

wherein D is a single fiber diameter (μm), ρ is a density (g/cm$^3$) of polymer forming the single fiber, d is a single fiber thickness (denier), and π is the circle constant (the number π).

A ratio L/D of a fiber length L (mm) to the single fiber diameter D (mm) of the thermoplastic staple fiber and the hot-melt fiber is preferably in a range from $0.5 \times 10^3$ to $2.0 \times 10^3$. The ratio L/D has a close relationship to the ease of producing the entangling between fibers. If this ratio is less than $0.5 \times 10^3$, the fibers are easily mobile by the application of fluid jet to be well interlaced, but the number of contact points of interaction between fibers is absolutely few to lower the mechanical strength. Contrarily, if the ratio L/D exceeds $2.0 \times 10^3$, the mobility of fibers is restricted during the interlacing operation to disturb the fiber entanglement and also to lower the mechanical strength.

A degree of entanglement between fibers can be represented by a mean fiber entangling point interval.

That is, as the entangling density is higher and the fibers are compactly entangled with each other, the mean fiber entangling point interval becomes smaller. While, if the entangling density is lower, the interval becomes larger.

It is necessary that the wet-laid nonwoven fabric for a battery separator according to the present invention has a three-dimensionally entangled uniform structure in the cross-section thereof having the mean fiber entangling point interval of 300 μm or less, preferably 250 μm or less, more preferably 200 μm or less and, most preferably 150 μm or less. The problem of insufficient strength inherent to the prior art wet-laid nonwoven fabric made of staple fibers can be solved while maintaining a favorable uniformity by such a compactly entangled configuration having the mean fiber entangling point interval of 300 μm or less. As a result, since the wet-laid nonwoven fabric for a battery separator according to the present invention has a uniform formation never seen in the prior art, it is possible to suppress the migration of electrode material (i.e., passing of active material through fiber interstice), even though a basis weight of a battery separator is small, and to improve the short-circuit preventing ability and a cycle performance for repeating the charging/discharging. Also, since a mechanical strength is high, it is possible to reduce a basis weight of a battery separator, and incorporate more electrode active material therein to achieve a high capacity ratio of a battery.

Since the battery separator according to the present invention has a low internal resistance when incorporated in a battery because of a compactly entangled structure such that the mean fiber entangling point interval is 300 μm or less, a secondary battery has an excellent performance such that a charging voltage is low and a discharging voltage is high. Also, since a resistance to compressive force is high, the separator is resistant to the thickness change of electrode when the battery is repeatedly charged and discharged, whereby the rise of internal resistance is avoidable, which may occur due to the drying-out of electrolyte in the separator caused by the compression thereof. Contrarily, when the interlacing density is poor such that the mean fiber entangling point interval is more than 300 μm, the battery separator having the above-mentioned features and effects is not obtainable.

The wet-laid nonwoven fabric for a separator according to the present invention has a uniform basis weight and the sheet formation thereof is preferably 100 or less and, more preferably 80 or less.

If the sheet formation exceeds 100, the irregularity of basis weight becomes too large to suppress the migration of electrode active material through a portion having a smaller basis weight, resulting in the shortcircuit or the deterioration of the cycle performance of a secondary battery.

An electric resistance of the wet-laid nonwoven fabric according to the present invention is preferably 1 Ω or less and, more preferably 0.8 Ω. If the electric resistance is more than 1.0 Ω, a charging voltage of the secondary battery becomes high or a predetermined discharging voltage is not obtainable.

If a compression stress of the wet-laid nonwoven fabric according to the present invention is 3.0 kg/cm$^2$ or more, the battery separator is resistant to collapse when the electrode swells upon discharging. The compression stress is more preferably 3.5 kg/cm$^2$ or more. If the compression stress is less than 3.0 kg/cm$^2$, there may be a problem in that the separator tends to collapse in the battery with time, which tends to raise the internal resistance.

A basis weight of the wet-laid nonwoven fabric according to the present invention is in a range from 10 to 350 g/m$^2$, preferably from 25 to 150 g/m$^2$ and, more preferably from 35 to 100 g/m$^2$.

A thickness thereof is in a range from 30 to 1000 μm, preferably from 70 to 400 μm and, more preferably from 90 to 250 μm.

If the basis weight is less than 10 g/m$^2$ and the thickness is less than 30 μm, the strength becomes too low to completely prevent the migration of active material, and an amount of electrolyte retained therein becomes too little to function as a battery separator. Contrarily, if the basis weight exceeds 350 g/m$^2$ and the thickness exceeds 1000 μm, the fiber entanglement becomes insufficient, and the electric resistance rises and the electrode active material cannot be sufficiently filled therein. Thus, a sufficient electric capacity cannot be expected.

In the battery separator according to the present invention, an apparent density of the wet-laid nonwoven fabric calculated from the basis weight and the thickness is preferably 0.26 g/cm$^2$ or more, more preferably in a range from 0.3 to 0.7 g/cm$^3$ and, further more preferably from 0.35 to 0.6 g/cm$^3$. If the apparent density is less than 0.26, the electrolyte holding capability becomes insufficient, although the air permeability is high, whereby the electrolyte is liable to be absorbed by the electrode. This may cause a problem when the separator is built into a sealed type secondary battery in that the charging/discharging cycle performance is deteriorated. On the other hand, if the apparent density exceeds 0.7 g/cm$^3$, the air permeability is significantly lowered to inhibit the migration of gas generated due to the electrode reaction, resulting in the deterioration of the cycle characteristic of the sealed type secondary battery.

Since the wet-laid nonwoven fabric for a battery separator according to the present invention is produced by a wet-laying process and is subjected to a hydroentangling treatment, both of which necessitate a large amount of water, a surfactant imparted to a fiber surface during a spinning process is almost rinsed off, whereby the affinity with an acidic or alkaline electrolyte becomes poor if a skeleton of thermoplastic fiber polymer has no hydrophilic groups (COOH, SO$_3$H, OH, COOM, SO$_3$M, OM (wherein M represents a light or heavy metal)). To impart a hydrophilic nature to the wet-laid nonwoven fabric according to the present invention, the application of surfactant, the sulfonation or fluorination by chemicals such as fuming sulfuric acid or chlorosulfonic acid, or the formation of carbonyl groups carboxyl groups or hydroxyl group on the fiber surface by a corona discharge or a plasma discharge may be properly selected. When the surfactant is used for imparting the hydrophilic nature, an amount of surfactant to the nonwoven fabric is preferably 2% or less by weight, more preferably in a range 0.05 to 1% by weight, whereby no deterioration occurs in the electrolyte holding capability to improve the cycle performance of the sealed type secondary battery.

If the amount exceeds 2% by weight, although the hydrophilic nature is improved to satisfy the liquid absorption rate, there may be a problem in that the excessive surfactant tends to be released into the electrolyte and is deposited again onto the electrode plate whereby the electrolyte in the separator migrates to the electrode plate with time.

The surfactant usable for this purpose may be a general type hydrophilic agent, preferably alkaline-resistant non-ion type surfactant such as polyoxyethylenealkylether or polyoxyethylenealkylphenylether.

HLB, which is a measure for representing the hydrophilic nature or lipophilic nature of the non-ion type surfactant, is in a range from 10 to 17 and, preferably from 12 to 16 but, it is not limited thereto.

If the HLB is less than 10, the surfactant is hardly dissolved into water and needs a solvent such as isopropyl alcohol, which complicates the production process.

Contrarily, if the HLB exceeds 17, the surfactant does not satisfy the aimed high hydrophilic nature and therefore the battery separator according to the present invention is not obtainable.

If the wet-laid nonwoven fabric for a separator according to the present invention has raised fibers on the surface thereof, the electrolyte in the separator is further inhibited from being absorbed into the electrode to enhance the electrolyte holding capability, and the gas absorption reaction in the electrode is accelerated due to micro-voids formed by the raised fibers, whereby the sealed type secondary battery incorporating such a separator therein exhibits a further excellent cycle performance and an improvement in the overcharge characteristic.

It is assumed that, according to the raised fibers on the surface of the nonwoven fabric, fibers in the nonwoven fabric having a micron order thickness can be individually brought into contact with the electrode at a high density, whereby voids created in a non-raised portion become discontinuous and extremely small. As a result, the contact area between the separator and the electrode includes a number of micro-voids arranged in a discontinuous manner at a high density due to the raised fibers and the migration of the electrolyte from the separator to the electrode can be suppressed. Accordingly, the electrolyte retention capability is high enough to resist the compressive force due to the swelling of electrode caused by charging/discharging cycles. Thereby the rise of internal resistance caused by the migration of electrolyte to the electrode becomes low, resulting in the significant improvement in the cycle life. In addition, the discontinuous micro-voids densely created between the wet-laid nonwoven fabric for a battery separator having raised fibers according to the present invention and the electrode facilitate the oxygen gas absorption reaction in boundary planes between three phases; gas, liquid and solid, in a sealed type nickelcadmium secondary battery, which enhances the cycle performance and the overcharging performance.

As a result of studies for the quantitative evaluation of length and density of the raised fiber, it was found that a preferable degree of fiber-raising on the sheet surface can be determined by the measurement of thickness-wise compression stress of the nonwoven fabric. That is, the larger a repulsion stress (hereinafter referred to as a raised fiber stress F) measured at a position 0.1 mm away from a surface of the nonwoven fabric on which the raised fibers are completely flattened, the longer the length of the raised fiber and the higher the density thereof, and contrarily, the smaller the raised fiber stress, the shorter the length of the raised fiber and the lower the raised fiber density. The raised fiber stress F in the battery separator according to the present invention is preferably in a range from 0.5 to 5.0, more preferably from 1.0 to 4.0 and, further more preferably from 1.5 to 4.0. If the raised fiber stress F is less than 0.5, an amount and length of raised fibers becomes insufficient for achieving the aimed discontinuous contact with the electrode via the raised fibers. Therefore the migration of electrolyte to the electrode is not sufficiently prevented. On the other hand, if the raised fiber stress exceeds 5.0, there may be another problem in that the raised fibers are liable to fall out.

Next, a method for producing the wet-laid nonwoven fabric for a battery separator according to the present invention will be described below.

At least one kind of thermoplastic staple fibers and hot-melt fibers having a single diameter D of 20 μm and a ratio of a fiber length L (mm) to a single fiber diameter D (mm) in a range from $0.5 \times 10^3$ to $2.0 \times 10^3$ are prepared. A slurry is prepared by dispersing these fibers in water to a concentration in a range from 0.1 to 3% by weight. If the ratio L/D is in a range from $0.5 \times 10^3$ to $2.0 \times 10^3$, a nonwoven fabric having a uniform sheet formation is obtained.

For example, when the thick and short staple fibers having the ratio L/D of less than $0.5 \times 10^3$ are used, a wet-laid sheet having a uniform sheet formation is obtained but, during the hydroentangling treatment, the staple fibers in the nonwoven structure are mobile to exhibit a fiber migration phenomena, resulting in an entangled sheet having a high irregularity in the surface appearance and basis weight and a low strength, which sheet formation exceeds 100 and is unfavorable. Contrarily, if the ratio L/D exceeds $2.0 \times 10^3$, the dispersibility of the staple fibers deteriorates to form fibrous lumps during the production process for the wet-laid sheet due to the fiber entanglement and exhibits a cirrocumulus-like appearance, having a sheet formation exceeding 100.

The slurry is treated by a long net type, a long inclined wire net type or a circular net type papermaking machine to be a wet-laid sheet. Then, the resultant mixture fiber sheet is placed on a conveyor net and entangled by cylindrical columnar fluid jets ejected from nozzles disposed thereabove. The fluid referred to herein is preferably liquids, and of them, water is most preferable in view of ease of handling, cost and impinging energy.

While the hydraulic pressure of the water is varied in accordance with kinds of fibers and basis weights of sheets to be treated, it should be in a range from 3 to 100 kg/cm² and, preferably from 3 to 50 kg/cm², for the purpose of obtaining a sufficient entanglement between fibers.

When the kinds of fibers are the same, as the basis weight and the processing rate are lower, the hydraulic pressure must be lower, while as the basis weight and the processing rate are higher, the hydraulic pressure must be higher. When fibers having a higher Young's modulus are used, a higher hydraulic pressure is preferably applied to result in the aimed mechanical strength according to the present invention. A diameter of the nozzle ejecting water jet is in a range from 0.01 to 1 mm, preferably from 0.05 to 0.3 mm and, more preferably from 0.08 to 0.2 mm for the purpose of protecting the surface of the resultant sheet from roughness and perforation. A nozzle pitch is preferably in a range from 0.5 to 10 mm. When a nozzle header is rocked in a manner described below, water jet marks are liable to overlap with each other in the crosswise direction, if the nozzle pitch is small, to cause a widthwise pattern and the fiber migration accompanied therewith. Accordingly, the nozzle pitch is preferably in a range from 1 to 10 mm and, more preferably from 2 to 5 mm when the nozzle header is rocked. The water jet marks may be lines in parallel to the running direction of the mixture fiber sheet but preferably a curve depicted by a rotary motion or a reciprocation of a header carrying the nozzles transverse to the running direction of the sheet. Particularly, overlapped circular marks obtained by the rotary motion is especially favorable because an ejection area of the water jet to the sheet per nozzle becomes larger to effectively carry out the fiber entanglement and make the irregularity of water jet marks invisible, otherwise the product quality is deteriorated.

A distance between the nozzle and the conveyor net carrying the sheet is 100 mm or less, preferably 50 mm or less. For example, in the most favorable aspect for obtaining a sufficiently interlaced sheet wherein the formation irregularity due to the continuous marks of the water jets is minimized and the favorable uniformity of the mixture fiber sheet is maintained, a metallic net having a mesh size in a range from 10 to 100 is disposed between the nozzle and the conveyor net at a distance of 25 mm from the conveyor net to convert continuous columnar water jets to intermittent columnar water jets or water sprays.

In this aspect, both of the rocking motion of the nozzle header and the insertion of the metallic net having a mesh size in a range from 10 to 80 are necessary for achieving the object of the present invention. That is, if the metallic net is solely inserted, not accompanying the rocking motion of the nozzle header, the intermittent columnar water jets and wave-shaped marks caused thereby are not obtainable. Instead, a continuous linear mark of the water jet may be formed if an open space exists in a region of the metallic net directly beneath the nozzle, or no water jet mark may appear at all if the columnar water jet is completely interrupted by a wire of the metallic net. It is also conceivable to move the inserted metallic net and fix the nozzle header. However, this is unfavorable in view of the distribution of the entangled points. According to such an entanglement, the discontinuous wave-shaped marks are obtainable due to the intermittent columnar water jets, and an extremely uniform wet-laid nonwoven fabric having the sheet formation of 100 and, preferably 80 is achievable.

A suction is applied from the lower side of the conveyor net to quickly and sufficiently remove the treatment water. A static pressure of the suction is −30 mmHg or more and, preferably −50 mmHg or more, more preferably −80 mmHg or more, whereby a uniform fiber entanglement is attainable while suppressing the migration of fibers, resulting in a high strength wet laid nonwoven fabric.

The water jet treatment may be alternately carried out on front and back sides of the mixture fiber sheet, or solely on one side.

The number of water jet treatments may be optionally selected in accordance with the purpose. For a mixture fiber sheet having a relatively smaller basis weight, for example, in a range from 10 to 100 g/m², the treatment is preferably carried out under the hydraulic pressure in a range from 3 to 40 kg/cm² on both sides or one side.

In any cases, the entangling treatment must be continued until the mean fiber entangling point interval of 300 μm or less, preferably 200 μm or less and, more preferably 150 μm or less is reached.

According to this entangling treatment, fibers composing the mixture fiber sheet are entangled with each other by the water jets to form a firm bonding. That is, the staple fibers and the hot-melt fibers are three-dimensionally entangled with each other.

If the mean fiber entangling point interval exceeds 300 μm, no sufficient mechanical strength is obtainable. Also, since the fiber orientation in the cross-sectional direction of the nonwoven fabric is insufficient, the compression stress becomes lower to increase the electric resistance. Thus, a battery separator suitable for the practical use is not obtainable.

Next, the resultant entangled sheet is heat-treated to fuse part or all of the hot-melt fibers. The heat-treatment is preferably carried out by a non-contact type hot air drier for a short time, for example, in a range from 5 seconds to 10 minutes, to not deteriorate the gas-permeability and the electrolyte retention ratio. The heat-treatment temperature is higher than a melting point of the hot-melt fiber and lower than that of the staple fiber.

According to such a heat-treatment, the thermoplastic staple fibers and the hot-melt fibers are adhered with each other at the entangled points by the fused hot-melt fibers while maintaining the three-dimensionally entangled structure. If the heat-treatment is carried out on a sheet wherein such a three-dimensional entanglement is not done or the mean fiber entangling point interval exceeds 300 μm, a fused film is formed between fibers arranged in a side-by-side manner because there are few entangle points between the thermoplastic staple fibers and the hot-melt fibers. This is apparently distinguished from the sheet of the present invention. It is thought that, according to the present invention, the three-dimensionally entangled structure having the mean fiber entangling point interval of 300 μm or less is fixed as it is at a number of entangled points by the fused hot-melt fibers, whereby a high electrolyte holding capability and a small electric resistance necessary for the battery separator are obtained.

The nonwoven fabric for a battery separator thus obtained is subjected to a compression treatment if a thickness adjustment is necessary, by means of a calender drier or a embosser. In such a case, however, conditions must be selected not to extremely lower the gas permeability and the electrolyte retention ratio. Also, a hydrophilic treatment may be carried out to enhance an initial affinity of the separator with electrolyte. Such a hydrophilic treatment includes an application of a generally used surfactant, a sulphonation treatment, a fluorination treatment, a plasma treatment or a corona discharge treatment.

The hydrophilic treatment is preferably carried out prior to the compression treatment by means of the calender drier or the embosser if a hydrophilic product further improved in uniformity is desired, but the present invention is not limited thereto. That is, when the hydrophilic treatment is carried out after the compression treatment, the electrolyte is liable to be irregularly permeable through the separator because of the treatment unevenness on the fiber surface.

The wet-laid nonwoven fabric thus obtained is useful for a battery separator requiring not only the separation ability between cathode and anode, the short-circuit preventing ability and the electrolyte retention capability but also the gas permeability in a secondary battery, which performances must not deteriorate even after the repetition of charging/discharging cycles.

The wet-laid nonwoven fabric having the above-mentioned characteristics is used for a primary battery such as a manganese battery using a zinc anode and a manganese dioxide cathode or an alkali-manganese battery using an alkaline electrolyte, and is favorably used for a secondary battery which is repeatedly charging/discharging and requires that no deterioration occurs in the separator performance even after the repetition of charging/discharging.

The secondary battery includes, for example, a lead storage battery using a sulfuric acid electrolyte, a lead anode and a lead dioxide cathode, a nickel-cadmium type alkaline storage battery using alkaline electrolyte, a cadmium anode and a nickel oxyhydroxide cathode, a nickel-iron type alkaline storage battery using an iron powder anode instead of the cadmium anode, and a nickel-hydrogen type alkaline storage battery using a hydrogen (hydrogen-adsorption alloy) anode. In addition to performances required for the primary battery, such as a high electromotive force, a small internal resistance, a large electric capacity per unit weight or unit volume of the battery, or a small self-discharge, the secondary battery requires a high charging/discharging cycle performance and a high safety in overcharged/discharged states. Also, the deterioration of performances must be inhibited even after the repetition of charging/discharging cycles. If oxygen and hydrogen generated by the decomposition of water during charging can be minimized or completely consumed, it is possible to seal the secondary battery. The above-mentioned secondary batteries are of a sealed type and used as a power source for a portable appliance. When a separator is mounted in a sealed type tubular alkaline secondary battery, the nonwoven fabric is stretched in the vertical direction by a constant tension and compressed in the thickness direction. Accordingly, the separator is required to have a porous structure even in a compressed state and a capability for maintaining an electrolyte in the interior of the separator not to move toward an electrode having an extremely high hydrophilic nature. Further, accompanied with the repetition of the charging/discharging cycle, a volume of electrode plate is liable to change (due to the density variation of nickel hydroxide and nickel β-oxyhydroxide), which causes the displacement of electrolyte from the separator to the electrode, resulting in the dry-out of electrolyte in the separator. To prevent such a phenomenon from occurring, a high electrolyte retention capability is required. Since the wet-laid nonwoven fabric is excellent in electrolyte retention capability and electrolyte holding capability, it is possible to retain a sufficient amount of electrolyte in the interior of the compressed separator and thus suppress the rise of the internal resistance, resulting in a secondary battery having a long cycle life. On the other hand, oxygen gas generated in the cathode during charging by hydrolysis of water increases the internal pressure of the battery. The oxygen gas must quickly pass through the separator and be consumed by an oxygen absorption reaction in the anode. Since the separator made of the wet-laid nonwoven fabric according to the present invention has a favorable gas permeability and a suitable wet property, the secondary battery incorporating this separator therein is capable of minimizing the rise of the internal pressure and preventing the electrolyte from blowing out by the actuation of a safety valve. Also, since the separator according to the present invention has a uniform and compact entangled structure and is free from the formation irregularity, it is possible to prevent an electrode active material and a dendritic metal separating out on the electrode plate during charging/discharging from breaking through the separator. Thus, the short-circuit is prevented from occurring even when severe charging/discharging is repeated, and a long life secondary battery is provided. Recently, electric appliances have been miniaturized to be portable. Therefore, secondary batteries for supplying power thereto necessarily have a small size, a high capacity, a long life span or a favorable cycle performance. To provide these high performance batteries, a separator plays an important role. That is, to achieve such a high capacity secondary battery, a larger amount of electrode active material must be filled in the battery, which in turn requires a separator having a smaller thickness. The wet-laid nonwoven fabric according to the present invention is quite suitable for such a separator because it has a uniform formation and is excellent in electrolyte holding capability, gas-permeability and short-circuit preventing ability.

EXAMPLES

The present invention will be described in more detail below with reference to the preferred examples. In the examples, measured values were obtained from the following methods wherein % is by weight. Test pieces which are liable to be affected by temperature and humidity were conditioned in a room or a device under standard conditions (temperature of 23°±3° C., relative humidity of 65±5%).

1) Thickness

Three test pieces of 20 cm×20 cm size were prepared and a thickness was measured at 10 points per each piece by a micrometer. An average thereof was used as a representative thickness.

2) Basis weight

After the test piece of 20 cm×20 cm size used for the thickness test was conditioned to the standard condition, a weight thereof was measured, and the value was then converted to a weight per one square meter.

3) Tensile strength (in the lengthwise direction)

A tensile strength was measured, in accordance with JIS L1096: a strip method, along the lengthwise direction (the running direction of a nonwoven fabric).

Five test pieces (each having a length of 18 cm×a width of 2.5 cm) were prepared. A maximum load at break was measured by a tensile tester at a grip distance of 10 cm and a stretching rate of 200 mm/min.

4) Gas-permeability

Five test pieces of 13 cm×13 cm size or more were prepared, and gas-permeability was measured in accordance with JIS L1096: Frazier method, at a pressure difference of 12.7 mmAq.

5) Electrolyte retention ratio

Three test pieces of 10 cm×10 cm size were prepared, and weights thereof ($W_1$) were measured in 1 mg order after being conditioned to the standard condition. The test pieces were dipped into an aqueous solution of potassium hydroxide of 31% concentration in a spread state for one hour or more. Then the test pieces were taken out from the solution and hung down with one corner up for 10 minutes. Weights of the test pieces ($W_2$) were again measured. An electrolyte retention ratio (%) was calculated by the following equation $$(W_2-W_1)/W_2 \times 100$$

6) Liquid absorption rate

Five test pieces having 20 cm×2.5 cm size were prepared and conditioned under the standard condition. A lower end of the test piece was vertically dipped by 5 mm into an aqueous solution of potassium hydroxide of 31% concentration. 30 minutes after, a rising height (mm) of the solution due to capillarity was measured as a measure of a liquid absorption rate.

7) Electrolyte holding ratio

Two test pieces of 3.4 cm×5 cm size were prepared and conditioned under the standard condition. A weight thereof ($a_1$) was measured in 1 mg order. Then the test piece was impregnated with an aqueous solution of potassium hydroxide of 31% concentration of the same weight ($a_1$). The test piece was placed on filter paper (ADVANTEC No. 4A) and loaded with a weight of 100 g. 30 seconds later, a weight ($a_2$) of the test piece was measured. An electrolyte holding ratio (%) was calculated by the following equation.

$$a_2/a_1 \times 100$$

8) Sheet formation

A sheet formation was measured by a formation tester (FMT-1000A: Nomura Shoji K.K.). Three test pieces of 15 cm×15 cm were prepared and placed on a diffusion plate. A light was irradiated to the test piece by a tungsten lamp of a constant voltage of direct current (6V, 30W) from the lower side thereof. A transparent image in a range of 100 mm×100 mm taken by a CCD camera was divided into 128×128 pixels. An intensity of light in the respective pixel was measured to determine a transmittance thereof, from which an absorbency was calculated. The sheet formation was obtained by the following equation wherein E is a mean absorbency and σ is a standard deviation of the absorbency in the respective micro-area (0.78 mm×0.78 mm).

$$\text{Sheet formation} = 1000 \times \sigma / E$$

This value most clearly represents a variance of basis weights in micro-areas, and the lower the value, the higher the uniformity of the test piece.

9) Electric resistance

An amount of KOH aqueous solution of 31% concentration corresponding to 90% of a weight of the test piece was poured onto a test piece of 3.4 cm×5 cm size. The test piece was sandwiched between a pair of nickel plates of 3 mm thick, and an electric resistance was measured by a milliohm meter under the standard conditions.

10) Compression stress measurement

A test piece of 5 mm×5 mm was prepared and a compression stress was measured by a compression tester KES-F system at 20° C. and 65% RH when a compressed thickness thereof reached 80% of an original thickness.

11) Raised fiber stress F

Figure 4:
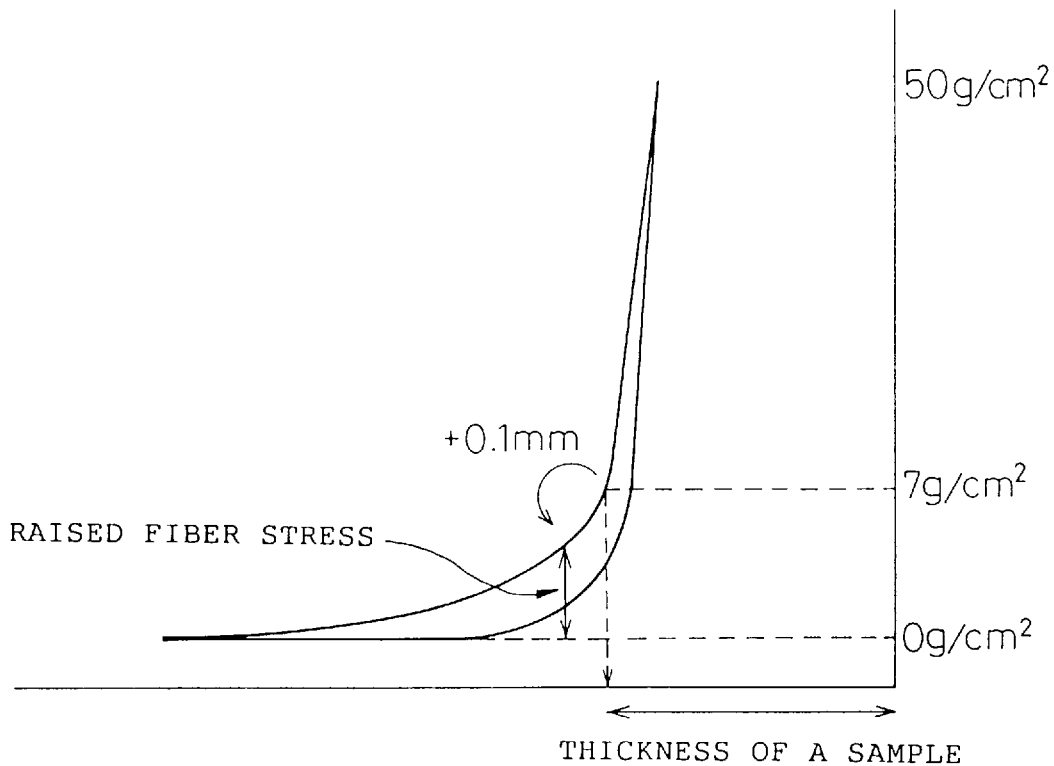
FIG. 4 schematically shows one example of a stress-strain curve when a compressive load is applied to a surface of a raised wet-laid nonwoven fabric according to the present invention.

A sample was prepared by brushing a raised surface in the reverse direction with a soft brush of pig bristles and a stress-strain curve of a surface compression of the sample (FIG. 4) was measured by a KES-3 compression tester. A thickness when a load of 7 g/cm² is applied to the sample was defined as a sample thickness wherein the raised fibers all lie on the surface. A raised fiber stress F was defined as a stress at a thickness equal to the sample thickness plus 0.1 mm.

12) Mean fiber entangling point interval

The mean fiber entangling point interval is a value measured by the following method disclosed in Japanese Unexamined Patent Publication No. 58-191280, which is a measure representing an entangling density of fibers wherein the smaller the value, the more compact a degree of entanglement. FIG. 1 is a schematic enlarged view of fibers composing a surface of a nonwoven sheet according to the present invention as seen in a microscopic manner. An optional pair of fibers $f_1$, $f_2$ in such fibers $f_1$, $f_2$, $f_3$ . . . were selected and an entangled point a, therebetween was detected. The upper fiber $f_2$ is traced to another entangled point $a_2$ at which it is submerged beneath a third fiber. Similarly, entangled points $a_3$, $a_4$ . . . were determined. Then, linear horizontal distances between the thus-obtained entangled points $a_1$ and $a_2$, $a_2$ and $a_3$ . . . were measured, which were then averaged to define a mean fiber entangling point interval.

13) Battery cycle characteristic test

A sealed type nickel-cadmium secondary battery of an SC size having a nominal capacity of 1.2 AH was prepared while using a battery separator according to the present invention, on which a cycle characteristic test was carried out, wherein after charging the same for one hour with a current of 1.8A, discharging is carried out until reaching a terminal voltage of 1.0 V.

14) Battery overcharge characteristic test

A hundred sealed type nickel-cadmium type secondary batteries of an SC size having a nominal capacity of 1.2 AH were prepared while using a battery separator according to the present invention, on which a overcharge/discharge characteristic test was carried out, wherein after continuing the charging for one week, the number of the batteries from which an electrolyte is leaked out by the operation of a safety valve of the secondary battery (detected by a phenolphthalein indicator) was counted, which was represented by %.

EXAMPLE 1

A 1% concentration slurry was prepared by dispersing in water 80% of nylon 66 staple fibers having a fiber length L of 7.5 mm, a fiber thickness of 0.5 denier (a single fiber diameter D of 7.8 $\mu$m; L/D=960) and a melting point of 250° C. and 20% of hot-melt fibers Unimelt UL-61 (available from Unitika K.K.; a nylon 6 core component and a nylon copolymer sheath component) having a fiber length of 10 mm and a fiber thickness of 2 denier (a single fiber diameter D of 14.1 mm; L/D=709). A wet-laid mixture fiber sheet having a basis weight of 75 g/m$^2$ was obtained from this slurry by a long inclined wire type long net papermaking machine. The resultant wet-laid mixture fiber sheet was placed on a metallic conveyor net of 80 mesh running at a speed of 12 m/min. A nozzle header on which nozzles having a nozzle diameter of 0.15 mm are arranged at a pitch of 2 mm was disposed above the metallic conveyor net at a distance of 50 mm and subjected to a circular motion at a speed of 285 rpm. Another metallic net of 40 mesh was inserted between the sheet on the metallic conveyor net and the nozzles at a distance of 25 mm from the metallic conveyor net. Water was ejected from the nozzles at a pressure of 30 kg/cm$^2$ to form intermittent columnar water jets which strike the mixture fiber sheet. The water was dehydrated by suction of −80 mmHg static pressure applied from the lower side of the conveyor net, whereby the water was continuously and quickly removed therefrom, without generating water jet marks or deteriorating a formation of the sheet, to result in the fiber entanglement between the staple fibers and the hot-melt fibers. After the same process has been repeated six times, the sheet was turned upside-down and the same process was repeated seven times. Then, the nozzle header was made to rotate at 420 rpm, and the metallic net between the sheet and the nozzles was changed from a 40 mesh one to a 60 mesh one. Water jets of 25 kg/cm$^2$ hydraulic pressure were applied twice to the respective side of the sheet to result in an entangled sheet. Continuous stripe marks due to columnar water jets were not observed at all in the interlaced sheet.

The entangled sheet was dried by a pin-tenter drier at 180° C. so that the sheath portion of Unimelt UL-61 fiber (melting point 140° C.) in the entangled sheet was fused. After being immersed into an aqueous solution containing a nonion type surfactant Shintol KP (available from Takamatsu Yushi K.K.) of 0.2% for the purpose of improving the initial affinity with electrolyte, the sheet was squeezed so that a pickup becomes 200% of the weight of the nonwoven fabric, and dried by a pin tenter drier at 160° C. Then, the entangled sheet was introduced into a pair of rollers heated at 100° C. and subjected to a calendering treatment at a line pressure of 30 kg/cm to result in a final nonwoven fabric for a battery separator having a basis weight of 72 g/m$^2$ and a thickness of 0.18 mm.

EXAMPLE 2

From a 1% concentration slurry prepared by dispersing in water 40% of nylon 66 staple fibers having a fiber length L of 7.5 mm and a fiber thickness of 0.5 denier (a single fiber diameter D of 7.8 $\mu$m; L/D=960), 40% of nylon 66 staple fibers having a fiber length L of 10 mm and a fiber thickness of 1.0 denier (single fiber diameter D of 11 $\mu$m; L/D=940) and 20% of hot-melt fibers Unimelt UL-61 (available from Unitika K.K.; a nylon 6 core component and a nylon copolymer sheath component) having a fiber length of 10 mm and a fiber thickness of 2 denier (a single fiber diameter D of 14.1 mm; L/D=709), a wet-laid mixture fiber sheet having a basis weight of 75 g/m$^2$ was obtained by the same manner as in Example 1. The wet-laid sheet was subjected to the entangling treatment, the surfactant application treatment and the calendering treatment in the same manner as in Example 1 to result in a final nonwoven fabric for a battery separator having a basis weight of 72 g/m$^2$ and a thickness of 0.18 mm, having no stripe marks on the surface thereof.

EXAMPLE 3

A wet-laid mixture fiber sheet prepared from 80% of nylon 66 staple fibers having a fiber length L of 7.5 mm and a fiber thickness of 0.5 denier and 20% of Unimelt UL-61 having a fiber length of 10 mm was placed on a 80 mesh metallic net in the same manner as in Example 1, and subjected to the entangling treatment while changing a hydraulic pressure of 30 kg/cm$^2$ and 25 kg/cm$^2$ in Example 1 to 25 kg/cm$^2$ and 20 kg/cm$^2$, respectively, to result in an entangled sheet. The entangled sheet was subjected to the surfactant application treatment and the calendering treatment in the same manner as in Example 1 to result in a uniform nonwoven fabric for a battery separator having a basis weight of 72 g/m$^2$ and a thickness of 0.18 mm with no irregularity in formation and stripe marks.

COMPARATIVE EXAMPLE 1

A wet-laid mixture fiber sheet prepared from 80% of nylon 66 staple fibers having a fiber length L of 7.5 mm and a fiber thickness of 0.5 denier and 20% of Unimelt UL-61 having a fiber length 10 mm was hot-pressed at 160° C. and 70 g/cm$^2$ without the hydroentanglement treatment described in Example 1, and then dried by a pin tenter drier at 180° C. to fuse the Unimelt UL-61 fibers in the sheet. Further, in the same manner as in Example 1, a surfactant was applied to the sheet, which then was calendered to result in a nonwoven fabric usable for a battery separator having a basis weight of 74 g/m$^2$ and a thickness of 0.18 mm.

COMPARATIVE EXAMPLE 2

A wet-laid mixture fiber sheet prepared from 80% of nylon 66 staple fibers having a fiber length L of 7.5 mm and a fiber thickness of 0.5 denier and 20% of Unimelt UL-61 fibers having a fiber length of 10 mm was placed on a 80 mesh metallic net in the same manner as in Example 1, and subjected to an entanglement treatment while changing a hydraulic pressure of 30 kg/cm$^2$ and 25 kg/cm$^2$ in Example 1 to 15 kg/cm$^2$ and 10 kg/cm$^2$, respectively, to result in an entangled sheet. The interlaced sheet was subjected to the surfactant application treatment and the calendering treatment in the same manner as in Example 1 to result in a uniform nonwoven fabric usable for a battery separator having a basis weight of 73 g/m$^2$ and a thickness of 0.18 mm.

COMPARATIVE EXAMPLE 3

80% of nylon 66 staple fibers having a fiber length L of 38 mm and a fiber thickness of 0.5 denier (a single fiber diameter D of 7.8 μm; L/D=4870) were mixed by a carding method with 20% of hot-melt fibers Unimelt UL-61 (available from Unitika K.K., a nylon 6 core component and a nylon copolymer sheath component) having a fiber length L of 51 mm and a fiber thickness of 2 denier (a single fiber diameter D of 14.1 Mm) to form a mixture fiber sheet. The sheet was entangled, applied with surfactant, and calendered in the same manner as in Example 1 to result in a nonwoven fabric usable for a battery separator having a basis weight of 73 g/m$^2$ and a thickness of 0.18 mm.

COMPARATIVE EXAMPLE 4

A 1% concentration slurry was prepared by dispersing in water 45% of nylon 66 staple fibers having a fiber length L of 7.5 mm and a fiber thickness of 0.5 denier, 25% of Unimelt UL-61 fibers having a fiber length L of 15 mm and a fiber thickness of 2 denier, and 30% of hot-melt type synthetic organic pulp SWP (UL-410 available from Mitsui Sekiyu Kagaku Kogyo K.K.) in the same manner as in Example 1, from which a wet-laid mixture fiber sheet having a basis weight of 80 g/m$^2$ was obtained through a papermaking machine. The sheet was subjected to a hydroentangling treatment in the same manner as in Example 1 to result in an entangled sheet. The entangled sheet was dried by a pin tenter drier at 180° C. so that the sheath component of Unimelt UL-61 and SWP (UL-410; a melting point of 125° C.) were fused, applied with a surfactant and subjected to a calendering treatment to result in a nonwoven fabric usable for a battery separator having a basis weight of 73 g/m$^2$ and a thickness of 0.18 mm in the same manner as in Examples.

Results of performance tests of the nonwoven fabrics for a battery separator obtained from Examples 1 to 3 and Comparative Examples 1 to 4 are shown in Table 1.

TABLE 1

|  | Ex. 1 | Ex. 2 | Ex. 3 | Com. 1 | Com. 2 | Com. 3 | Com. 4 |
|---|---|---|---|---|---|---|---|
| Yarns (L/D) | 0.5dN66 (960) Unimelt | 0.5dN66 1.0dN66 (940) Unimelt | 0.5dN66 (960) Unimelt | 0.5dN66 (960) Unimelt | 0.5dN66 (960) Unimelt | 0.5dN66 (4870) Unimelt | 0.5dN66 syn. pulp Unimelt |
| Sheet | wet-laid | wet-laid | wet-laid | wet-laid | wet-laid | dry laid | wet-laid |
| Basis weight (g/m$^2$) | 72 | 72 | 72 | 74 | 73 | 73 | 72 |
| Thickness (mm) | 0.18 | 0.18 | 0.18 | 0.18 | 0.18 | 0.18 | 0.18 |
| Sheet formation | 74 | 77 | 70 | 70 | 72 | 116 | 105 |
| Tensile strength (kg/cm$^2$) | 3.3 | 3.5 | 3.1 | 2.0 | 2.4 | 3.5 | 3.2 |
| Gas permeability (cc/cm$^2$/sec) | 20 | 28 | 21 | 18 | 19 | 21 | 17 |
| Electrolyte retention ratio (%) | 330 | 345 | 333 | 310 | 315 | 335 | 270 |
| Electrolyte holding ratio (%) | 90 | 87 | 89 | 62 | 63 | 79 | 68 |
| Liquid absorption rate (mm) | 88 | 78 | 85 | 62 | 79 | 86 | 48 |
| Compression stress (kg/cm$^2$) | 3.94 | 4.12 | 3.86 | 2.01 | 2.21 | 3.33 | 2.00 |
| Electric resistance (Ω) | 0.65 | 0.70 | 0.69 | 2.10 | 1.56 | 1.10 | 3.50 |
| Mean fiber entangling point interval (μm) | 120 | 140 | 200 | >350 | 320 | 150 | 305 |

As apparent from Table 1, the nonwoven fabrics of Examples 1 to 3 have a higher tensile strength and a lower electric resistance and more excellent in electrolyte holding ratio compared with those of Comparative Examples 1 and 2. This is because the interlacing treatment has been repeated until the mean fiber entangling point interval becomes less than 120 μm–200 μm which increases the number of entangled points between fibers and enhances the fiber orientation in the cross-sectional direction of the nonwoven fabric as a separator. Thus, the compression stress increases to facilitate the contact of the separator with a nickel plate. The synergistic effect of these phenomena causes the above-mentioned favorable results. Since the nonwoven fabric obtained from Comparative Example 3 has a higher entangling density compared with those of Comparative Examples 1 and 2, the electric resistance thereof is lower and the electrolyte retention capability is higher. However, these properties of comparitive example 3 are considerably inferior to those of Example 1 and cannot be used in practice. This is because the irregularity of basis weights of the nonwoven fabric of Comparative Example 3 is large as seen from a fact that it has a large sheet formation, and thus a contact area between the separator and the nickel plate is substantially minimized. Also, since the sheet formation thereof is unfavorably high, the migration of the electrode active material cannot be sufficiently suppressed to deteriorate the short-circuit preventing ability (see FIG. 2).

Sealed type nickel-cadmium storage batteries of SC size having a nominal capacity of 1.2 AH were prepared while using separators made of the nonwoven fabrics of Examples 1, 2 and 3 and Comparative Examples 1, 2, 3 and 4. A cycle performance test was carried out thereon, wherein the battery was charged for one hour with a current of 1.8 A and discharged to a terminal voltage of 1.0 V at a current of 1.2 A.

Figure 2:
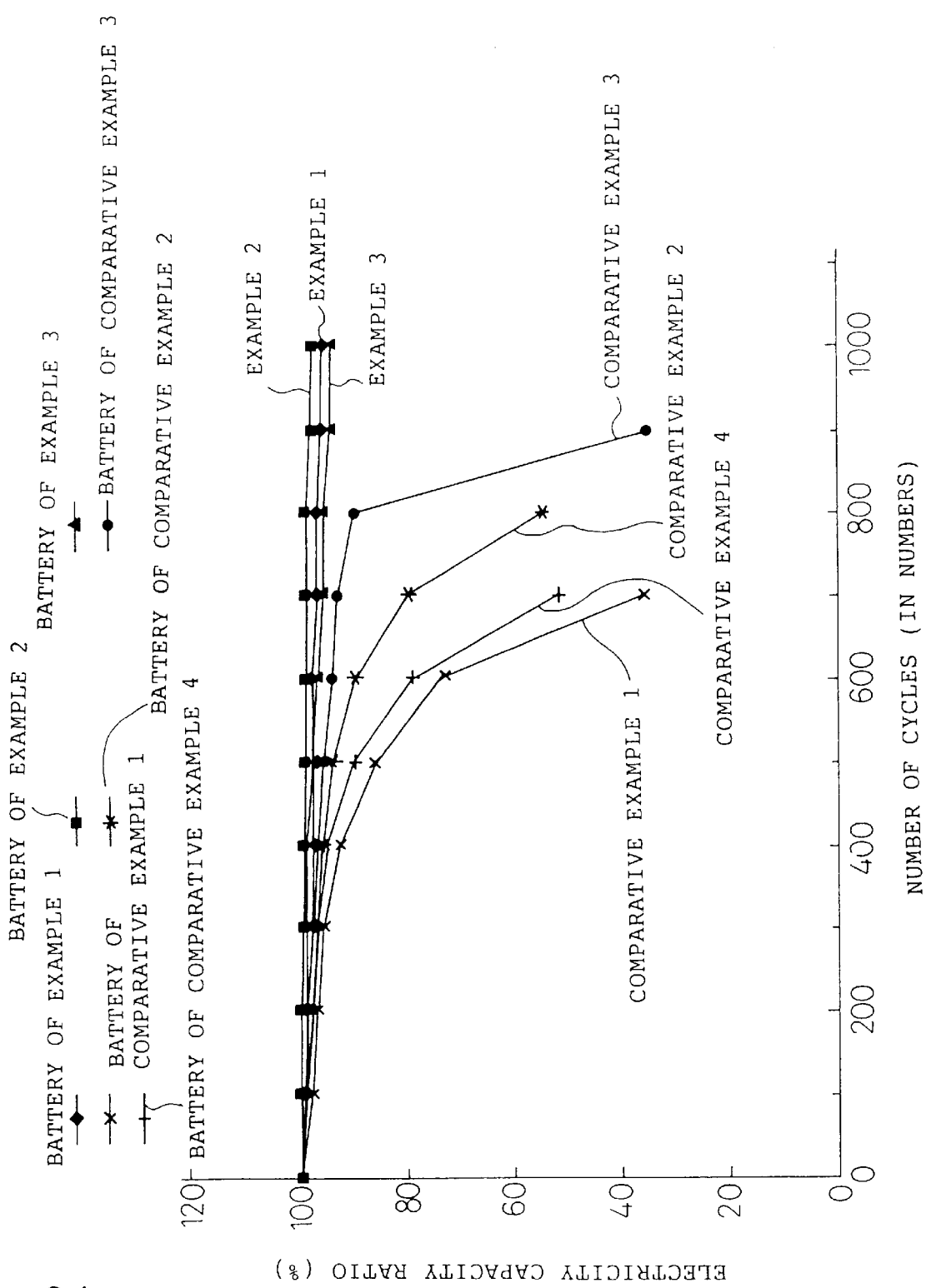
FIG. 2 shows graphs illustrating the relationship between an Electricity capacity ratio and a cycle number of a secondary battery using wet-laid nonwoven fabrics for a battery separator according to Examples 1 to 3 of the present invention, in comparison with that of the Comparative Examples.

FIG. 2 shows the results thereof. The batteries using the separators made of nonwoven fabrics of Examples 1, 2 and 3 exhibit an extremely excellent cycle performance wherein a degree of reduction in battery capacity when the charging/discharging cycle is repeated is smaller than in the batteries using the separators made of nonwoven fabrics of Comparative Examples 1, 2, 3 and 4. The batteries of Comparative Examples 1, 2 and 4 terminated their lives by the exhaustion of electrolyte in the separator (dry-out) upon the repetition of charging/discharging cycles, and the battery of Comparative Example 4 terminated its life by a short-circuit due to the migration of electrode active material.

According to such facts, it is proved that the wet-laid nonwoven fabric according to the present invention is comprised of a compactly entangled fibrous structure having a uniform formation and a mean fiber entangling point interval of 300 μm or less, and the battery separator obtained thereby is excellent in compression stress, electric resistance and electrolyte holding capability, whereby absorption of the electrolyte in the separator to the electrode and migration of electrode active material through the separator hardly occurs upon the repetition of charging/discharging cycles in the secondary battery.

EXAMPLE 4

A wet-laid mixture fiber sheet was prepared from 75% of nylon 66 staple fibers having a fiber length L of 15 mm and a fiber thickness of 2.0 denier (a single fiber diameter D of 14.1 μm; L/D=1060) and 25% of hot-melt fibers Unimelt UL-61 in the same manner as in Example 1. The sheet was subjected to the entangling treatment, the surfactant application treatment and the calendering treatment in the same manner as in Example 1 to result in a nonwoven fabric for a battery separator having a basis weight of 85 g/m² and a thickness of 0.20 mm.

COMPARITIVE EXAMPLE 5

A wet-laid mixture sheet was prepared from 75% of nylon 66 staple fibers having a fiber length L of 15 mm and a fiber thickness of 2.0 denier (a single fiber diameter D of 14.1 μm; L/D=1060) and 25% of hot-melt fibers Unimelt UL-61 having a fiber length L of 10 mm and a fiber thickness of 2.0 denier (a single fiber diameter of 14.1 μm; L/D=710) in the same manner as in Example 3. The sheet was not subjected to the hydroentangling treatment carried out in Example 1, but directly hot-pressed at a temperature of 160° C. and a pressure of 70 g/cm², then dried by a pin tenter drier set at 180° C. so that the Unimelt UL-61 fibers are fused in the sheet. Thereafter, the sheet was subjected in the same manner as in Example 1 to the surfactant application treatment and the calendering treatment to result in a nonwoven fabric having a basis weight of 86 g/m² and a thickness of 0.21 mm.

COMPARITIVE EXAMPLE 6

A mixture fiber sheet was prepared by a carding method from 75% of nylon 66 staple fibers having a fiber length L of 51 mm and a fiber thickness of 2.0 denier (a single fiber diameter D of 14.1 μm; L/D=3600) and 25% of hot-melt fibers Unimelt UL-61 (available from Unitika K.K., a nylon 6 core component and a nylon copolymer sheath component) having a fiber length L of 51 mm and a fiber thickness of 2 denier (a single fiber diameter D of 14.1 μm; L/D=3600). The sheet was subjected in the same manner as in Example 1 to the interlacing treatment, the surfactant application treatment and the calendering treatment to result in a nonwoven fabric having a basis weight of 84 g/m² and a thickness of 0.20 mm.

EXAMPLE 5

A wet-laid mixture fiber sheet having a basis weight of 75 g/m² was obtained from a 1% concentration slurry prepared by dispersing in water nylon 6/nylon 612 (80:20) composite staple fibers of a hexalobal petal shaped cross-section (capable of being divided into six nylon 6 microfibers of 0.27 denier and one nylon 612 microfiber of 0.4 denier) having a fiber length L of 15 mm and a fiber thickness of 2.0 denier (a single fiber diameter D of 14.1 μm; L/D=1060) and 20% of hot-melt fibers Unimelt UL-61 (available from Unitika K.K., a nylon 6 core component and a nylon copolymer sheath component) having a fiber length L of 10 mm and a fiber thickness of 2 denier (a single fiber diameter D of 14.1 μm; L/D=710) in the same manner as in Example 1. Thereafter, the sheet was subjected to the entangling treatment in the same manner as in Example 1 and heat-treated in a pin tenter drier at 160° C. Further the sheet was subjected to the entangling treatment, the surfactant application treatment and the calendering treatment in the same manner as in Example 1 to result in a nonwoven fabric having a basis weight of 72 g/m² and a thickness of 0.18 mm.

COMPARITIVE EXAMPLE 7

A wet-laid mixture fiber sheet was prepared from 80% of the same nylon 6/nylon 612 composite staple fibers as used in Example 5 except that the fiber length L is changed to 5 mm and 20% of the same hot-melt fibers as used in Example 5. The sheet was subjected to the hydroentangling treatment in the same manner as in Example 5 and dried at 180° C. by a pin tenter drier. The resultant entangled sheet was inferior in a sheet formation due to the fiber migration upon the hydroentangling treatment and had many pin holes. A 0.01% concentration aqueous dispersion slurry of hot-melt synthetic pulp SWP (UL-410) comprised of polyethylene used in Example 4 was poured onto a surface of this entangled sheet in a similar manner as in Example 1 of Japanese Unexamined Patent Publication No. 7-272709 to deposit the synthetic pulp of about 5 g/m² on the surface of the sheet, which was then dried at 130° C. The pin holes were eliminated from the sheet, but the inferiority in sheet formation due to the irregularity of basis weight was not improved. The sheet was finally subjected to the calendering treatment and the surfactant application treatment as in Example 5 to result in a nonwoven fabric having a basis weight of 72 g/m² and a thickness of 0.18 mm.

A performance test carried on battery separators made of the nonwoven fabrics obtained from Examples 4 and Comparative Examples 5 to 7 are listed in Table 2.

As apparent from Table 2, since the wet-laid nonwoven fabric of relatively thick staple fibers obtained from Example 4 is highly entangled and uniform in sheet formation, it has a higher tensile strength and a lower electric resistance compared with Comparative Example 5 as well as a lower electric resistance compared with Comparative Example 6, which satisfies a requisite for a general-use type battery separator.

The surface layer of the nonwoven fabric of Example 5 had a compactly entangled structure of the micro-fibers split by the columnar water jets, but non-split fibers having a fiber thickness of 2 denier were still left in the internal structure as they are. It had a rather high electric resistance but was usable for a battery separator. In Comparative Example 7, L/D of the nylon 6/nylon 612 composite staple fiber was as small as 354, and the extremely uniform wet-laid mixture sheet was obtained. However, some of the test pieces were inferior in sheet formation due to the fiber migration during the hydroentangling treatment and had many pin holes. Although the pin holes were eliminated by depositing the synthetic pulp layer, the sheet formation was not improved because the synthetic pulp layer was irregularly deposited. Also, the variance in hydrophilic nature was significant. The separator obtained therefrom had a low electrolyte holding capability and a high electric resistance, and thus was not usable in practice.

TABLE 2

|  | Ex. 4 | Com. 5 | Com. 6 | Ex. 5 | Com. 7 |
|---|---|---|---|---|---|
| Yarns (L/D) (L/D) | 2.0dN66 (1060) Unimelt | 2.0dN66 (1060) Unimelt | 2.0dN66 (3600) Unimelt | 2.0dN66/ N612 (1060) Unimelt | 2.0dN66/ N612 (354) Unimelt |
| Sheet | wet-laid | wet-laid | dry-laid | wet-laid | wet-laid |
| Basis weight (g/m$^2$) | 85 | 86 | 84 | 72 | 72 |
| Thickness (mm) | 0.20 | 0.21 | 0.20 | 0.18 | 0.18 |
| Sheet formation | 90 | 85 | 121 | 95 | 154 |
| Tensile strength (kg/cm$^2$) | 3.9 | 2.3 | 4.2 | 3.7 | 1.7 |
| Gas permeability (cc/cm$^2$/sec) | 63 | 60 | 62 | 21 | 15 |
| Electrolyte retention ratio (%) | 365 | 350 | 360 | 305 | 300 |
| Electrolyte holding ratio (%) | 80 | 62 | 72 | 91 | 70 |
| Liquid adsorption rate (mm) | 111 | 87 | 115 | 105 | 74 |
| Compression stress (kg/cm$^2$) | 4.21 | 2.11 | 4.24 | 2.85 | 1.76 |
| Electric resistance (Ω) | 0.73 | 2.25 | 1.45 | 0.85 | 3.25 |
| Mean fiber entangling point interval (μm) | 240 | >400 | 300 | >135 | 308 |

EXAMPLE 6

A 1% concentration slurry was prepared by dispersing in water 80% of nylon 6 staple fibers having a fiber length L of 6 mm and a fiber thickness of 0.25 denier (a single fiber diameter D of 5.4 μm; L/D=1100) and 20% of hot-melt fibers Unimelt UL-61 (available from Unitika K.K.; a nylon 6 core component and a nylon copolymer sheath component) having a fiber length L of 10 mm and a fiber thickness of 2 denier (a single fiber diameter D of 14.1 μm; L/D=709). A wet-laid mixture fiber sheet having a basis weight of 68 g/m$^2$ was obtained from the slurry through a long inclined wire-type papermaking machine. The resultant mixture fiber sheet was placed on a 80 mesh metallic conveyor net and conveyed at a speed of 12 m/min. A nozzle header on which nozzles having a nozzle diameter of 0.15 mm are arranged at a pitch of 2 mm was subjected to a circular motion at a speed of 285 rpm. A 40 mesh metallic net was inserted between the nozzle header and the conveyor net at a distance of 25 mm from the conveyor net, and water was ejected from the nozzles at a pressure of 25 kg/cm$^2$ to the mixture fiber sheet so that intermittent columnar water jets impinge thereto. Thus, the staple fibers and the hot-melt fibers were entangled with each other. The same treatment was repeated six times on one side of the sheet. Then the sheet was turned upside down, and the same treatment was repeated seven times on the other side. Thereafter, while inserting a 60 mesh metallic net, the nozzle header was rotated at a speed of 420 rpm to spray water twice on the respective side at a hydraulic pressure of 20 kg/cm$^2$ to result in an interlaced sheet.

The resultant entangled sheet was dried by a pin tenter drier at 160° C. to simultaneously fuse the sheath component of the Unimelt UL-61 fiber (having a melting point of 140° C.) to result in a nonwoven fabric. Although this nonwoven fabric was usable for a battery separator as it is, the nonwoven fabric was dipped into an aqueous solution containing a nonion type surfactant Emulgen 910 (available from Kao K.K.) of 0.05%, squeezed to have a pickup corresponding to 400% thereof, and dried by a pin tenter drier at 160° C. to further improve the initial affinity with electrolyte. Then, the treated sheet was introduced into a pair of rolls heated at 100° C. and calendered at a line pressure of 30 kg/cm$^2$ to result in a nonwoven fabric for a battery separator having a basis weight of 65 g/m$^2$ and a thickness of 0.15 mm.

EXAMPLE 7

A wet-laid mixture fiber sheet was prepared from 40% of nylon 6 staple fibers having a fiber length L of 6 mm and a fiber thickness of 0.25 denier (a single fiber diameter D of 5.4 μm), 40% of nylon 66 staple fiber having a fiber length of 7.5 mm and a fiber thickness of 0.5 denier (a single fiber diameter of 7.8 μm) and 20% of hot-melt fibers Unimelt UL-61 in the same manner as in Example 6. Then, the mixture fiber sheet was subjected to the entangling treatment, the surfactant application treatment and the calendering treatment in the same manner as in Example 6 to result in a nonwoven fabric for a battery separator having a basis weight of 65 g/m$^2$ and a thickness of 0.15 mm.

EXAMPLE 8

Island-in-sea type splittable fibers (available from Kolon Inc. (phonetic); a polyester copolymer island component and a nylon 66 sea component; splittable to 36 islands) was treated in a 4% sodium hydroxide solution so that the sea component was dissolved to leave micro-fibers of the island component having a fiber thickness of 0.05 denier. A wet-laid mixture fiber sheet was obtained from 80% of these nylon 66 micro-fibers having a fiber length of 3 mm and a fiber thickness of 0.05 denier (a single fiber diameter D of 2.3 μm; L/D=1300) and 20% of hot-melt fibers Unimelt UL-61 in the same manner as in Example 6. The mixture fiber sheet was subjected to the entangling treatment, the surfactant application treatment and the calendering treatment in the same manner as in Example 6 to result in a nonwoven fabric for a battery separator having a basis weight of 65 g/m$^2$ and a thickness of 0.15 mm.

COMPARITIVE EXAMPLE 8

A melt-blown type nylon 6 nonwoven fabric prepared to have an average fiber diameter of 2 μm, a basis weight of 65 g/m$^2$ and a thickness of 0.3 mm was subjected to the entangling treatment, the surfactant application treatment and the calendering treatment in the same manner as in Example 6 to result in a nonwoven fabric having a basis weight of 65 g/m$^2$ and a thickness of 0.15 mm. The resultant nonwoven fabric had a considerably lower mechanical strength and air permeability and was inferior in electrolyte holding capability compared to those obtained from Examples 6, 7 and 8.

COMPARITIVE EXAMPLE 9

A wet-laid mixture fiber sheet having a basis weight of 30 g/m$^2$ prepared from 80% of nylon 66 staple fibers having a fiber length L of 7.5 mm and a fiber thickness of 0.5 denier (a single fiber diameter D of 7.8 μm) and 20% of hot-melt fibers Unimelt UL-61 was overlaid on a melt-blown type nylon 6 nonwoven fabric prepared to have an average fiber diameter of 2 μm, a basis weight of 35 g/m$^2$ and a thickness of 0.3 mm. The resultant overlaid sheet was subjected to the interlacing treatment, the surfactant application treatment and the calendering treatment in the same manner as in Example 1 to result in a nonwoven fabric having a basis weight of 65 g/m² and a thickness of 0.15 mm.

Figure 3:
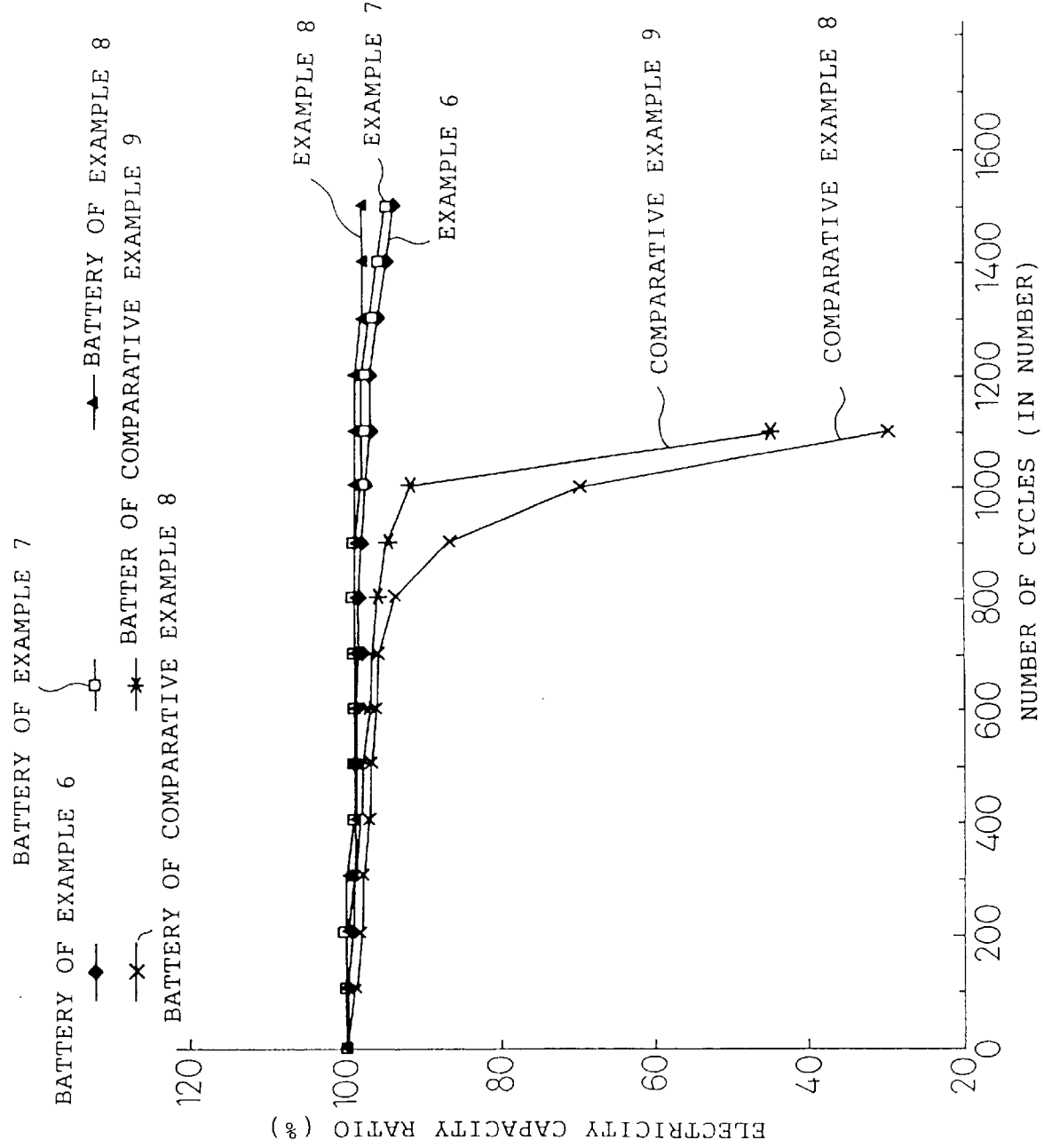
FIG. 3 shows graphs illustrating the relationship between an Electricity capacity ratio and a cycle number of a secondary battery using wet-laid nonwoven fabrics for a battery separator according to Examples 6 to 8 of the present invention, in comparison with that of the Comparative Examples.

Results of a performance test of the nonwoven fabrics obtained from Examples 6, 7 and 8 and Comparative Examples 8 and 9 as a battery separator are shown in Table 3. As apparent from Table 3, the nonwoven fabric obtained from Comparative Example 9 was inferior to those obtained from Examples 6, 7 and 8 in mechanical strength, air permeability and electrolyte holding capability as well as in sheet formation. On the other hand, as apparent from Table 3, the nonwoven fabrics for a battery separator according to the present invention were excellent in sheet formation and had a high tensile strength, gas-permeability, electrolyte retention capability and electrolyte holding capability, and also had a favorable liquid absorption rate. Also, as shown in FIG. 3, it was found that the internal resistance can be effectively prevented from rising when the thermoplastic staple fiber has a fiber thickness of less than 0.5 denier, and a charging/discharging cycle performance of a sealed type secondary battery is enhanced.

EXAMPLE 9

The entangled sheet obtained from Example 1 was dried by a pin tenter drier at 180° C. to fuse the sheath component of the Unimelt UL-61 fiber (having a melting point of 140° C.). Then, the sheet was dipped into aqueous solutions of nonion-type surfactant Emulgen 120 (available from Kao K.K.) of 0.05%, 0.1%, 0.25%, 0.5%, 1% and 2% concentrations and water with no surfactant (to obtain Sample Nos. 1 to 7, respectively). The respective sample was squeezed to have a pickup of 200% of its own weight and dried in a pin tenter drier at 160° C. Further, the sample was calendered by a pair of metallic rolls at a line pressure of 30 kg/cm in the same manner as in Example 1 to result in a nonwoven fabric for a battery separator having a basis weight of 73 g/m² and a thickness of 0.18 mm. Physical properties and performances of the samples thus obtained as a battery separator are shown in Table 4. The sample on which no nonion type surfactant is present is poor in hydrophilic nature. The greater the amount of surfactant, the higher the hydrophilic nature but the lower the electrolyte holding ratio.

TABLE 3

|  | Ex. 6 | Ex. 7 | Ex. 8 | Com. 8 | Com. 9 |
|---|---|---|---|---|---|
| Yarns (L/D) | 0.25dN66 (1100) Unimelt | 0.25dN66 0.5dN66 Unimelt | 0.05dN66 (1300) Unimelt | 2 μmN6 | 2 μmN6 0.5dN66 Unimelt |
| Sheet | wet-laid | wet-laid | wet-laid | melt-blown | overlaid |
| Basis weight (g/m²) | 65 | 65 | 65 | 65 | 65 |
| Thickness (mm) | 0.15 | 0.15 | 0.15 | 0.15 | 0.15 |
| Tensile strength (kg/cm²) | 3.1 | 3.4 | 3.2 | 0.9 | 1.8 |
| Gas permeability (cc/cm²/sec) | 11 | 12 | 10 | 6 | 8 |
| Electrolyte retention ratio (%) | 300 | 302 | 310 | 310 | 301 |
| Electrolyte holding ratio (%) | 95 | 95 | 96 | 92 | 92 |
| Liquid absorption rate (mm) | 120 | 110 | 120 | 100 | 100 |
| Compression stress (kg/cm²) | 3.4 | 3.45 | 3.50 | 1.43 | 2.10 |
| Electric resistance (Ω) | 0.65 | 0.60 | 0.70 | 1.12 | 1.20 |
| Mean fiber entangling point interval (μm) | 90 | 95 | 45 | 160 | 160 |
| Sheet formation | 55 | 56 | 49 | 43 | 103 |

Reference data for sheet formation: 52 (PPC paper)

TABLE 4

(Example 9)

|  | No. 7 | No. 1 | No. 2 | No. 3 | No. 4 | No. 5 | No. 6 |
|---|---|---|---|---|---|---|---|
| Basis weight (g/m²) | 72 | 72 | 72 | 72 | 72 | 72 | 72 |
| Thickness (mm) | 0.18 | 0.18 | 0.18 | 0.18 | 0.18 | 0.18 | 0.18 |
| Amount of surfactant (%) | 0 | 0.1 | 0.2 | 0.5 | 1.0 | 2.0 | 4.0 |
| Tensile strength (kg/cm²) | 3.8 | 3.7 | 3.6 | 3.6 | 3.5 | 3.1 | 2.3 |
| Electrolyte retention ratio (%) | No dip | 340 | 336 | 335 | 332 | 336 | 333 |
| Liquid absorption rate (mm) | 5 | 120 | 123 | 130 | 138 | 148 | 178 |
| Electrolyte holding ratio (%) | No dip | 92 | 92 | 90 | 87 | 78 | 69 |

EXAMPLE 10

The entangled sheet obtained from Example 1 was dried by a pin tenter drier at 180° C. to fuse the sheath component of Unimelt UL-61 (having a melting point of 140° C.) in the entangled sheet. Then, the sheet was dipped into an aqueous solution containing 0.2% nonion type surfactant Shintol KP (available from Takamatsu Yushi K.K.), squeezed to have a pickup of 200% of its weight, and dried by a pin tenter drier at 160° C.

Then the sheet was calendered by a pair of heated metallic rolls at mangle line pressures of 0, 5, 10, 20, 30, 40 and 50 kg/cm, respectively, while varying a temperature to result in Sample Nos. 1 to 7 of nonwoven fabrics for a battery separator having different thicknesses. Physical properties and performances are shown in Table 5. It was found that the lower the density, the higher the electrolyte retention ratio, but the lower the electrolyte holding ratio.

stress of 1.8 g/cm$^2$ was obtained in the same manner as in Example 6, except that the raising treatment is carried out on both surface thereof with a roll brush with nylon bristles.

EXAMPLE 14

A nonwoven fabric for a battery separator having a basis weight of 72 g/m$^2$, a thickness of 0.18 mm and a raised fiber stress of 1.3 g/cm$^2$ was obtained in the same manner as in Example 6, except that the raising treatment is carried out on both surfaces thereof with a roll brush with pig bristles.

Properties of nonwoven fabrics for a battery separator obtained from Examples 1 and 11 to 14 are shown in Table

TABLE 5

| | (Example 10) | | | | | | |
|---|---|---|---|---|---|---|---|
| | No. 7 | No. 1 | No. 2 | No. 3 | No. 4 | No. 5 | No. 6 |
| Basis weight (g/m$^2$) | 72 | 72 | 72 | 72 | 72 | 72 | 72 |
| Thickness (mm) | 0.30 | 0.28 | 0.24 | 0.20 | 0.18 | 0.16 | 0.14 |
| Density (g/cm$^3$) | 0.24 | 0.26 | 0.30 | 0.36 | 0.40 | 0.45 | 0.51 |
| Calendar pressure kg/cm | 0 | 5 | 10 | 20 | 30 | 40 | 50 |
| Air-permeability (cc/cm$^2$/s) | 48 | 42 | 36 | 31 | 24 | 20 | 17 |
| Electrolyte retention ratio (%) | 480 | 420 | 385 | 365 | 330 | 280 | 220 |
| Liquid absorption rate (mm) | 86 | 90 | 90 | 92 | 90 | 89 | 87 |
| Electrolyte holding ratio (%) | 74 | 85 | 88 | 90 | 90 | 88 | 66 |

EXAMPLE 11

The entangled sheet obtained from Example 1 was dried by a pin tenter drier at 180° C. to fuse the sheath component of the Unimelt UL-61 fiber (having a melting point of 140° C.) in the interlaced sheet. Then the sheet was dipped into an aqueous solution containing 0.2% nonion type surfactant Shintol KP (available from Takamatsu Yushi K.K.), squeezed to have a pickup of 200% of its weight, and dried by a pin tenter drier at 160° C.

Further the sheet was calendered by a pair of metallic rolls heated at a temperature of 100° C. and at a line pressure of 35 kg/cm, which was then subjected to a raising treatment on both sides with a 500 mesh sand paper to result in a nonwoven fabric for a battery separator having a basis weight of 72 g/m$^2$, a thickness of 0.18 mm and a raised fiber stress of 2.5 g/cm$^2$.

6. As is apparent from Table 6, the battery separators of Examples 11 to 14 having raised fibers on the surfaces were improved in electrolyte holding capability and gas permeability, and the rise of internal resistance thereof was suppressed at a lower level compared with that obtained from Example 1, which is favorable as a high performance battery separator. Actually, sealed type nickel-cadmium secondary batteries were prepared while using separators made from the nonwoven fabric thus obtained, on which a charging/discharging performance was evaluated. The batteries using the separators made from the nonwoven fabrics obtained from Examples 11 to 14 were improved in safety valve leakage. This is because oxygen gas generated in the cathode can easily pass through the battery separator and is consumed in the anode.

TABLE 6

| | Ex. 1 | Ex. 11 | Ex. 12 | Ex. 13 | Ex. 14 | Ex. 2 | Com. 1 |
|---|---|---|---|---|---|---|---|
| Basis weight (g/m$^2$) | 72 | 72 | 72 | 72 | 72 | 72 | 72 |
| Thickness (mm) | 0.18 | 0.18 | 0.18 | 0.18 | 0.18 | 0.18 | 0.18 |
| Raised fiber stress (kg/cm$^2$) | 0.6 | 2.5 | 3.5 | 1.8 | 1.3 | 0.7 | 0.4 |
| Tensile strength (kg/cm$^2$) | 3.3 | 3.1 | 3.0 | 3.2 | 3.5 | 3.5 | 2.0 |
| Electrolyte holding ratio (%) | 90 | 97 | 98 | 95 | 92 | 87 | 62 |
| Rise of internal resistance (Ω) | 0.16 | 0.10 | 0.10 | 0.12 | 0.13 | 0.17 | 0.46 |
| Charge/discharge performance (%) | 2 | 0 | 0 | 0 | 1 | 0 | 33 |

EXAMPLE 12

A nonwoven fabric for a battery separator having a basis weight of 62 g/m$^2$, a thickness of 0.18 mm and a raised fiber stress of 3.5 g/cm$^2$ was obtained in the same manner as in Example 6, except that the raising treatment is carried out on both surfaces thereof with a 180 mesh sand paper.

EXAMPLE 13

A nonwoven fabric for a battery separator having a basis weight of 72 g/m$^2$, a thickness of 0.18 mm and a raised fiber

CAPABILITY OF EXPLOITATION IN INDUSTRY

According to the present invention, it is possible to obtain a nonwoven fabric for a battery separator excellent in gas-permeability, electrolyte retention capability and liquid absorption rate.

Since the nonwoven fabric for a battery separator according to the present invention has high mechanical strength, no breakage or width contraction occurs when it is built into a battery. It has a uniform and compact entangled structure, and thus is resistant to the migration of active material to inhibit short-circuits. It is also excellent in gas permeability, electrolyte retention capability, liquid absorption rate, especially in electrolyte holding capability and gas consumption reactivity. Accordingly, it is suitably usable for a sealed type secondary battery, especially of a recent high capacity type. Actually, a secondary battery incorporating the nonwoven fabric according to the present invention as a separator is excellent in overcharging characteristic and has a long charging/discharging cycle life.

We claim:

1. A wet-laid nonwoven fabric for a battery separator comprising: a single nonwoven structure layer having a mean fiber entangling point interval of 300 µm or less, the structure layer comprised of a mixture of one kind or more of thermoplastic staple fibers in a range from 20 to 95% by weight and hot-melt staple fibers, the thermoplastic staple fibers and the hot-melt staple fibers each having a single fiber diameter of 20 µm or less and being three dimensionally entangled with each other, and wherein at least part of the hot-melt fibers are bonded to the thermoplastic staple fibers by fusing to fix the single nonwoven structure layer.

2. A wet-laid nonwoven fabric for a battery separator according to claim 1, wherein a ratio L/D of a fiber length L to an individual fiber diameter D of the thermoplastic staple fiber and the hot-melt staple fiber is in a range from $0.5 \times 10^3$ to $0.5 \times 10^3$.

3. A wet-laid nonwoven fabric for a battery separator according to claim 1, wherein the thermoplastic staple fibers are a mixture of staple fibers having an individual fiber diameter in a range from 1 to 8 µm and those having an individual fiber diameter larger than 8 µm but smaller than 20 µm.

4. A wet-laid nonwoven fabric for a battery separator according to claim 1, wherein a sheet formation of the nonwoven fabric is 100 or less.

5. A wet-laid nonwoven fabric for a battery separator according to claim 1, wherein an apparent density of the nonwoven fabric is 0.260 g/cm³ or more.

6. A wet-laid nonwoven fabric for a battery separator according to claim 1, wherein a surfactant of 2% by weight or less is applied to the nonwoven fabric.

7. A wet-laid nonwoven fabric for a battery separator according to claim 1, wherein a compression stress of the nonwoven fabric is 3.0 kg/cm² or more.

8. A wet-laid nonwoven fabric for a battery separator according to claim 1, wherein an electric resistance of the nonwoven fabric is 1 Ω or less.

9. A sealed type secondary battery assembled while incorporating therein a separator made of the nonwoven fabric for a battery separator according to any one of claims 1 to 8.

10. A method for producing a wet-laid nonwoven fabric for a battery separator, comprising:

applying intermittent fluid jets to a wet-laid mixture fiber sheet comprised of one kind or more of thermoplastic staple fibers in a range from 20 to 95% by weight and hot-melt staple fibers of the remaining part having a melting point lower by 20° C. or more than that of the thermoplastic staple fibers so that the fibers in the wet-laid mixture fiber sheet are three-dimensionally entangled with each other until a mean fiber entangling point interval of the wet-laid mixture fiber sheet becomes 300 µm or less; and fusing part or all of the hot-melt fibers to bond both the thermoplastic staple fibers and the hot-melt staple fibers by a heat treatment.

* * * * *

UNITED STATES PATENT AND TRADEMARK OFFICE
CERTIFICATE OF CORRECTION

PATENT NO. : 5,888,916
DATED : March 30, 1999
INVENTOR(S) : Yoshiyuki Tadokoro et al.

It is certified that error appears in the above-identified patent and that said Letters Patent is hereby corrected as shown below:

Title page,
Item [57], ABSTRACT,
Line 3, "20$\mu$rm" should read -- 20$\mu$m --.

Column 31,
Line 27, "0.5x10$^3$" (second occurrence) should read -- 2.0x10$^3$ --.

Signed and Sealed this

Seventeenth Day of December, 2002

JAMES E. ROGAN
*Director of the United States Patent and Trademark Office*